(12) United States Patent
Sung et al.

(10) Patent No.: US 12,138,619 B2
(45) Date of Patent: Nov. 12, 2024

(54) TUNABLE $NO_x$ ADSORBER

(71) Applicant: BASF MOBILE EMISSIONS CATALYSTS LLC, Iselin, NJ (US)

(72) Inventors: Shiang Sung, New York, NY (US); Markus Koegel, Roemerberg (DE); Gerd Grubert, Hannover (DE); Sven Jare Lohmeier, Hannover (DE); Alfred Punke, Walle (DE)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 0 days.

(21) Appl. No.: 17/593,379

(22) PCT Filed: Mar. 19, 2020

(86) PCT No.: PCT/IB2020/052545
§ 371 (c)(1),
(2) Date: Sep. 17, 2021

(87) PCT Pub. No.: WO2020/188519
PCT Pub. Date: Sep. 24, 2020

(65) Prior Publication Data
US 2022/0152595 A1 May 19, 2022

Related U.S. Application Data

(60) Provisional application No. 62/820,926, filed on Mar. 20, 2019.

(51) Int. Cl.
*B01J 23/10* (2006.01)
*B01D 53/94* (2006.01)
(Continued)

(52) U.S. Cl.
CPC ...... *B01J 23/6562* (2013.01); *B01D 53/9422* (2013.01); *B01D 53/9477* (2013.01);
(Continued)

(58) Field of Classification Search
CPC ........ B01J 23/6562; B01J 23/63; B01J 35/04; B01J 37/0201; B01J 23/10; B01J 23/42;
(Continued)

(56) References Cited

U.S. PATENT DOCUMENTS 5,874,057 A 2/1999 Deeba et al.
6,413,904 B1 7/2002 Strehlau et al.
(Continued)

FOREIGN PATENT DOCUMENTS

DE 10 2014 113304 A * 3/2015 ......... B01D 53/9418
FR 2 792 547 A1 * 10/2000 ......... B01D 53/9422
(Continued)

OTHER PUBLICATIONS

International Search Report dated Jun. 30, 2020, PCT/IB2020/052545.
(Continued)

*Primary Examiner* — Cam N. Nguyen
(74) *Attorney, Agent, or Firm* — DLA Piper LLP (US)

(57) ABSTRACT

The present disclosure is directed to a method for treating a gaseous exhaust stream containing nitrogen oxides ($NO_x$) from a diesel or lean-burn gasoline engine following a cold-start of the engine The method involves contact of the gaseous exhaust stream with at least a low temperature $NO_x$ adsorber (LT-NA) component. The LT-NA component includes a rare earth metal component, a platinum group metal (PGM) component, and a dopant. The present disclosure is also directed to a method of modulating a $NO_x$ adsorption/desorption profile of an LT-NA composition, a $NO_x$ desorption temperature range of an LT-NA composition, or both.

18 Claims, 24 Drawing Sheets

(51) Int. Cl.

| | |
|---|---|
| *B01J 23/42* | (2006.01) |
| *B01J 23/44* | (2006.01) |
| *B01J 23/46* | (2006.01) |
| *B01J 23/62* | (2006.01) |
| *B01J 23/63* | (2006.01) |
| *B01J 23/644* | (2006.01) |
| *B01J 23/656* | (2006.01) |
| *B01J 35/04* | (2006.01) |
| *B01J 35/56* | (2024.01) |
| *B01J 37/02* | (2006.01) |
| *B01J 37/03* | (2006.01) |
| *F01N 3/20* | (2006.01) |
| *F01N 3/28* | (2006.01) |

(52) U.S. Cl.
CPC .............. *B01J 23/63* (2013.01); *B01J 35/56* (2024.01); *B01J 37/0201* (2013.01); *B01J 37/038* (2013.01); *F01N 3/2066* (2013.01); *F01N 3/2803* (2013.01); *B01D 2255/1023* (2013.01); *B01D 2255/2047* (2013.01); *B01D 2255/2065* (2013.01); *B01D 2255/2073* (2013.01); *B01D 2255/2094* (2013.01); *B01D 2255/91* (2013.01); *B01D 2255/9155* (2013.01); *F01N 2370/04* (2013.01)

(58) Field of Classification Search
CPC . B01J 23/44; B01J 23/46; B01J 23/462; B01J 23/464; B01J 23/468; B01J 23/626; B01J 23/6445; B01J 23/6447; B01J 35/56; B01D 53/9422; B01D 53/9477; B01D 2255/1023; B01D 2255/2047; B01D 2255/2065; B01D 2255/2073; B01D 2255/2094; B01D 2255/91; B01D 2255/9155; F01N 3/2066; F01N 3/2803; F01N 2370/04; F01N 3/0814; F01N 3/0842; F01N 2240/18; F01N 2250/12; F01N 2250/14; F01N 2570/14
See application file for complete search history.

(56) References Cited

U.S. PATENT DOCUMENTS

| | | | |
|---|---|---|---|
| 8,449,852 B1 * | 5/2013 | Sung | B01J 23/44 502/514 |
| 8,853,123 B2 | 10/2014 | Jung | |
| 9,034,269 B2 * | 5/2015 | Hilgendorff | B01D 53/944 502/262 |
| 10,226,754 B2 * | 3/2019 | Grubert | B01J 35/56 |
| 10,328,388 B2 * | 6/2019 | Dumbuya | B01D 53/944 |
| 10,493,434 B2 * | 12/2019 | Grubert | F01N 3/2066 |
| 11,813,598 B2 * | 11/2023 | Sung | B01J 29/70 |
| 2004/0076565 A1 * | 4/2004 | Gandhi | F01N 3/108 422/177 |
| 2009/0149318 A1 * | 6/2009 | Gandhi | F01N 3/0814 502/73 |
| 2009/0297418 A1 * | 12/2009 | Liu | B01J 29/146 423/239.1 |
| 2009/0320457 A1 | 12/2009 | Wan | |
| 2015/0075140 A1 * | 3/2015 | Swallow | F01N 3/0842 60/274 |
| 2016/0341091 A1 | 11/2016 | Theis et al. | |
| 2017/0009623 A1 | 1/2017 | Armitage et al. | |
| 2017/0100707 A1 * | 4/2017 | Jung | B01J 23/002 |
| 2017/0320048 A1 | 11/2017 | Xue et al. | |
| 2017/0362978 A1 * | 12/2017 | Jung | B01D 53/9431 |
| 2018/0043335 A1 * | 2/2018 | Grubert | B01J 37/0246 |
| 2018/0093254 A1 * | 4/2018 | Duran-Martin | B01J 23/58 |
| 2018/0185788 A1 * | 7/2018 | Grubert | B01J 23/464 |
| 2019/0153921 A1 | 5/2019 | Gerlach et al. | |
| 2021/0113995 A1 * | 4/2021 | Kim | B01J 23/63 |

FOREIGN PATENT DOCUMENTS

| | | | | |
|---|---|---|---|---|
| GB | 2 381 478 A * | 5/2003 | | B01D 53/02 |
| KR | 10-1438953 B1 | 9/2014 | | |
| WO | WO 00 064 580 A1 * | 11/2000 | | B01D 53/9422 |
| WO | 2018/020463 A1 | 2/2015 | | |
| WO | 2016/141140 A1 | 9/2016 | | |

OTHER PUBLICATIONS

European Search Report for EP Patent Application No. 20773754.5, Issued on Nov. 8, 2022, 3 pages.

* cited by examiner

TUNABLE $NO_x$ ADSORBER

This application is a national phase application filed under 35 U.S.C. § 371 based on International Patent Application No. PCT/IB2020/052545, which was filed on Mar. 19, 2020, which claims the benefit of U.S. Provisional Application No. 62/820,926, filed Mar. 20, 2019; the contents of each application is incorporated herein by reference.

FIELD OF THE INVENTION

The present invention is directed to methods suitable for treating the exhaust gas stream of an internal combustion engine to reduce emissions of nitrogen oxides ($NO_x$).

BACKGROUND OF THE INVENTION

Environmental regulations for emissions of internal combustion engines are becoming increasingly stringent throughout the world. Operation of a lean-burn engine, for example a diesel engine, provides the user with excellent fuel economy due to its operation at high air/fuel ratios under fuel-lean conditions. However, diesel engines also emit exhaust gas emissions containing particulate matter (PM), unburned hydrocarbons (HC), carbon monoxide (CO), and nitrogen oxides ($NO_x$), wherein $NO_x$ describes various chemical species of nitrogen oxides, including nitrogen monoxide and nitrogen dioxide, among others. $NO_x$ are harmful components of atmospheric pollution. Various methods have been used for the treatment of $NO_x$-containing gas mixtures to decrease atmospheric pollution.

An effective method to reduce $NO_x$ from the exhaust of lean-burn engines requires reaction of $NO_x$ under lean burn engine operating conditions with a suitable reductant in the presence of a selective catalytic reduction (SCR) catalyst component. The SCR process typically uses as the reductant ammonia or a hydrocarbon in the presence of atmospheric oxygen, resulting in the formation predominantly of nitrogen and steam:

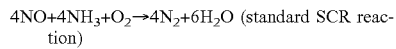
4NO+4NH$_3$+O$_2$→4N$_2$+6H$_2$O (standard SCR reaction)

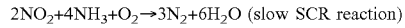
2NO$_2$+4NH$_3$+O$_2$→3N$_2$+6H$_2$O (slow SCR reaction)

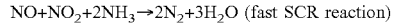
NO+NO$_2$+2NH$_3$→2N$_2$+3H$_2$O (fast SCR reaction)

Current catalysts employed in the SCR process include molecular sieves, such as zeolites, ion-exchanged with a catalytic metal such as iron or copper. A useful SCR catalyst component is able to effectively catalyze the reduction of the $NO_x$ exhaust component at temperatures below 600° C. so that reduced $NO_x$ levels can be achieved even under conditions of low load, which typically are associated with lower exhaust temperatures.

A major problem encountered in the treatment of automotive exhaust gas streams is the so-called "cold start" period, which is the time period at the beginning of the treatment process, when the exhaust gas stream and the exhaust gas treatment system are at low temperatures (i.e., below 150° C.). At these low temperatures, exhaust gas treatment systems generally do not display sufficient catalytic activity for effectively treating hydrocarbons (HC), nitrogen oxides ($NO_x$) and/or carbon monoxide (CO) emissions. In general, catalytic components such as SCR catalyst components are very effective in converting $NO_x$ to $N_2$ at temperatures above 200° C. but do not exhibit sufficient activities at lower temperature regions (<200° C.) such as those found during cold-start or prolonged low-speed city driving. Therefore, catalytic components capable of capturing and storing such low-temperature $NO_x$ emissions, and being able to release it at higher temperatures (>200° C.) when catalytic components (e.g., SCR catalyst components) become effective are in great demand As a result, considerable efforts have been made to alleviate this problem.

There are several ways to minimize $NO_x$ emissions during cold start periods. For instance, trapping systems have been developed which can store these exhaust gas emissions (i.e., HC, CO and $NO_x$ gases) at low temperatures and subsequently release them at higher temperatures, when the remaining catalytic components of the treatment system have attained sufficient catalytic activity. One such system is the Lean $NO_x$ Trap (LNT) catalyst, a well-known and commercially proven technology.

Lean $NO_x$ trap (LNT) catalysts contain $NO_x$ adsorbent components that trap $NO_x$ under certain exhaust conditions. For example, the $NO_x$ adsorbent components can comprise alkaline earth elements, e.g., including alkaline earth metal oxides and carbonates, such as oxides of Mg, Ca, Sr, and/or Ba. Other LNT catalysts can contain rare earth metal oxides as $NO_x$ adsorbent components, such as oxides of Ce, La, Pr, and/or Nd. LNT catalysts further contain a platinum group metal component (PGM) such as platinum dispersed on a refractory metal oxide (e.g., alumina) support for catalytic $NO_x$ oxidation and reduction. The LNT catalyst operates under cyclic lean (trapping mode) and rich (regeneration mode) exhaust conditions. Under lean conditions, the LNT catalyst traps and stores $NO_x$ as an inorganic nitrate (for example, where the $NO_x$ adsorbent component is BaO or BaCO$_3$, it is converted to Ba(NO$_3$)$_2$ upon reaction with ("trapping") of $NO_x$. The $NO_x$ adsorbent component then releases the trapped $NO_x$ and the PGM component reduces the $NO_x$ to $N_2$ under stoichiometric or transient rich engine operating conditions, or under lean engine operation with external fuel injected in the exhaust to induce rich conditions. NO to NO$_2$ conversion is a prerequisite to efficient $NO_x$ trapping; however the reaction rate is very slow when temperature is below 200° C., which renders the traditional LNT catalyst inefficient for trapping of cold-start $NO_x$ emission. Further, a rich purge is required to regenerate the LNT catalyst, which reduces fuel economy, however minimally Therefore, a preferred solution would be to have a $NO_x$ absorption/release component that operates under lean conditions only.

Due to emission regulations becoming increasingly more stringent, it would be highly desirable to provide an improved $NO_x$ adsorber to capture cold-start $NO_x$ emission. Employing a catalyst that is functional during low temperature operation (<150° C.) can help to meet these increasingly tighter emissions regulations (e.g., Euro-7 regulations). As >80% of cold-start $NO_x$ emission consists of NO, it is imperative that such advanced $NO_x$ adsorption materials have great efficiency for NO adsorption. A passive lean $NO_x$ adsorber (PNA) has recently been reported, which uses Pd on small pore zeolites as the $NO_x$ adsorbent. Drawbacks of this type of $NO_x$ adsorber are that they are not good for NO$_2$ adsorption, and the $NO_x$ adsorption and release window does not match exactly the transient cold-start vehicle requirements. Another type of $NO_x$ adsorber is the Low-Temperature $NO_x$ Adsorber (LT-NA), which uses rare earth and/or alkali metal adsorbents; these have the drawback that the $NO_x$ species tend to adhere to the $NO_x$ adsorbent at a wide range of active sites, rendering a broad $NO_x$ release temperature window, which also does not match transient cold-start vehicle requirements.

Accordingly, it would be highly desirable to provide an improved, tunable LT-NA to capture cold-start $NO_x$ emissions, the $NO_x$ adsorption/desorption properties of which can be adjusted to fit the requirements of each vehicle.

SUMMARY OF THE INVENTION

Methods for capturing and storing low-temperature $NO_x$ emissions, and releasing the $NO_x$ emissions at higher temperatures (>200° C.) when downstream catalytic components (i.e. SCR catalysts) become effective are in great demand Surprisingly, according to the present disclosure, it has been found that the adsorption/desorption properties of a low-temperature $NO_x$ adsorber (LT-NA) composition comprising a rare earth metal component, a platinum group metal (PGM) component, and a dopant, wherein the PGM and the dopant are disposed on or impregnated in the rare earth metal component, may be modulated by selecting the dopant and selecting the loading of the rare earth metal component, the PGM component, and the dopant. As such, the present disclosure generally provides methods for treating $NO_x$-containing exhaust streams with an LT-NA component comprising such a composition, and methods for modulating one or both of the $NO_x$ adsorption/desorption profile and the $NO_x$ desorption temperature range of such an LT-NA composition. In particular, the methods utilizing the LT-NA component disclosed herein are suitable for adsorbing $NO_x$ at low temperatures and controlling the elevated temperature for release of trapped $NO_x$ according to individual vehicle requirements.

Accordingly, in one aspect is provided a method for treating a gaseous exhaust stream comprising a mixture of nitrogen oxides ($NO_x$) flowing from the exhaust manifold of a diesel engine or a lean-burn gasoline engine during a period following cold-start of the engine, the method comprising contacting the gaseous exhaust stream with a low-temperature $NO_x$ adsorber (LT-NA) component comprising a LT-NA composition, the LT-NA component disposed downstream of and in fluid communication with the exhaust manifold, the LT-NA composition comprising a rare earth metal component; a platinum group metal (PGM) component; and a dopant selected from a transition metal oxide, an alkaline earth metal oxide, an oxide of an element of any of groups 13-15 of the periodic table, or a combination thereof; wherein the PGM and the dopant are disposed on or impregnated in the rare earth metal component; and wherein the LT-NA component is effective for storing the $NO_x$ at temperatures below 200° C., and releasing the stored $NO_x$ at a predetermined elevated temperature.

In some embodiments, the rare earth metal component comprises ceria. In some embodiments, the rare earth metal component is ceria.

In some embodiments, the dopant is a transition metal oxide. In some embodiments, the transition metal oxide is an oxide of manganese. In some embodiments, the dopant is an alkaline earth metal oxide. In some embodiments, the alkaline earth metal oxide is an oxide of magnesium, calcium, or barium. In some embodiments, the dopant is an oxide of an element of any of groups 13-15 of the periodic table. In some embodiments, the oxide of any of groups 13-15 of the periodic table is an oxide of boron, silicon, tin, phosphorus, antimony, or bismuth. In some embodiments, the dopant is an oxide of magnesium, manganese, or tin. In some embodiments, the dopant is an oxide of manganese.

In some embodiments, the PGM component comprises palladium, platinum, rhodium, rhenium, ruthenium, iridium, or a combination thereof. In some embodiments, the PGM component comprises palladium, platinum, or a mixture thereof.

In some embodiments, the predetermined $NO_x$ release temperature is above about 200° C. In some embodiments, the predetermined temperature is a temperature range of from about 200, about 225, about 250, or about 275, to about 300, about 325, about 350, about 400 or about 450° C.

In some embodiments, the LT-NA component comprises a substrate and one or more washcoats comprising the LT-NA composition disposed on at least a portion of the substrate. In some embodiments, the one or more washcoats are coated on the substrate in a layered or zoned configuration. In some embodiments, the substrate is a wall-flow or flow-through substrate.

In some embodiments, treating a gaseous exhaust stream comprises selectively removing at least a portion of $NO_x$ in the gaseous exhaust stream. In some embodiments, treating a gaseous exhaust stream comprises adjusting the distribution of nitric oxide (NO) and nitrogen dioxide ($NO_2$) in the gaseous exhaust stream.

In some embodiments, the LT-NA component is effective for storing one or more of NO and $NO_2$ at a temperature below about 200° C., and releasing one or both of NO and $NO_2$ at a predetermined temperature. In some embodiments, the predetermined temperature is above about 200° C. In some embodiments, the predetermined temperature is a temperature range of from about 200, about 225, about 250, or about 275, to about 300, about 325, about 350, about 400 or about 450° C. In some embodiments, the LT-NA component is effective for releasing one or both of NO and $NO_2$ at a temperature above about 300° C. In some embodiments, the LT-NA component is effective for releasing one or both of NO and $NO_2$ at a temperature above about 325° C.

In some embodiments, the contacting comprises: continually passing the gaseous exhaust stream into contact with the LT-NA component, the gaseous exhaust stream being at an initial temperature at or below about 150° C., and progressively warming during further engine operation; adsorbing and storing the $NO_x$ from the gaseous exhaust stream until the exhaust gas stream reaches a predetermined temperature, wherein the $NO_x$ is released into the exhaust gas stream exiting the LT-NA component; and continually passing the exhaust gas stream exiting the LT-NA component into contact with at least one downstream catalytic material for further oxidation of NO or for reduction of NO and $NO_2$ as the exhaust gas stream increases in temperature and heats each such downstream catalytic material to an operating temperature of between about 200° C. and about 450° C.

In another aspect is provided a method for modulating one or both of a $NO_x$ adsorption/desorption profile of a LT-NA composition and a $NO_x$ desorption temperature range of a LT-NA composition, the LT-NA composition comprising a rare earth metal component, a platinum group metal (PGM) component, and a dopant selected from a transition metal oxide, an alkaline earth metal oxide, an oxide of an element of any of groups 13-15 of the periodic table, or a combination thereof; wherein the PGM component and the dopant are disposed on or impregnated in the rare earth metal component; the method comprising selecting the dopant and selecting the loading of the rare earth metal component, the PGM component, and the dopant.

In some embodiments, the rare earth metal component comprises ceria. In some embodiments, the rare earth metal component is ceria.

In some embodiments, the $NO_x$ desorption temperature range is from about 150, about 175, about 200, about 225, or about 250, to about 275, about 300, about 325, about 350, or about 400° C. In some embodiments, NO is desorbed over a temperature range of from about 150, about 175, about 200, about 225, or about 250, to about 275, about 300, about 325, about 350, or about 400° C. In some embodiments, $NO_2$ is desorbed over a temperature range of from about 150, about 175, about 200, about 225, or about 250, to about 275, about 300, about 325, about 350, or about 400° C.

In some embodiments, modulating the $NO_x$ adsorption/desorption profile comprises adjusting the ratio of NO to $NO_2$ desorbed at a given temperature over the $NO_x$ desorption temperature range of the LT-NA composition.

In another aspect is provided a low-temperature $NO_x$ adsorber (LT-NA) composition comprising a rare earth metal component; a platinum group metal (PGM) component; and a dopant selected from a transition metal oxide, an alkaline earth metal oxide, an oxide of an element of any of groups 13-15 of the periodic table, or a combination thereof; wherein the PGM and the dopant are disposed on or impregnated in the rare earth metal component; and wherein the LT-NA composition is effective for storing the $NO_x$ at temperatures below 200° C., and releasing the stored $NO_x$ at a predetermined temperature. In some embodiments, the rare earth metal component comprises ceria.

In another aspect is provided a LT-NA article comprising a substrate and one or more washcoats comprising the LT-NA composition as disclosed herein disposed on at least a portion of the substrate. In some embodiments, the one or more washcoats are coated on the substrate in a layered or zoned configuration. In some embodiments, the substrate is a wall-flow or flow-through substrate.

The disclosure includes, without limitations, the following embodiments.

Embodiment 1: A method for treating a gaseous exhaust stream comprising a mixture of nitrogen oxides (NOx) flowing from the exhaust manifold of a diesel engine or a lean-burn gasoline engine during a period following a cold-start of the engine, the method comprising contacting the gaseous exhaust stream with a low-temperature NOx adsorber (LT-NA) component comprising a LT-NA composition, the LT-NA component disposed downstream of and in fluid communication with the exhaust manifold, the LT-NA composition comprising: a rare earth metal component; a platinum group metal (PGM) component; and a dopant selected from a transition metal oxide, an alkaline earth metal oxide, an oxide of an element of any of groups 13-15 of the periodic table, or a combination thereof; wherein the PGM and the dopant are disposed on or impregnated in the rare earth metal component; and wherein the LT-NA component is effective for storing the NOx at temperatures below 200° C., and releasing the stored NOx at a predetermined temperature.

Embodiment 2: The method of embodiment 1, wherein the rare earth metal component comprises ceria.

Embodiment 3: The method of embodiment 1 or 2, wherein the dopant is a transition metal oxide.

Embodiment 4: The method of embodiment 3, wherein the transition metal oxide is an oxide of manganese.

Embodiment 5: The method of any one of embodiments 1-4, wherein the dopant is an alkaline earth metal oxide.

Embodiment 6: The method of embodiment 5, wherein the alkaline earth metal oxide is an oxide of magnesium, calcium, or barium.

Embodiment 7: The method of embodiment 1 or 2, wherein the dopant is an oxide of an element of any of groups 13-15 of the periodic table.

Embodiment 8: The method of embodiment 7, wherein the oxide of any of groups 13-15 of the periodic table is an oxide of boron, silicon, tin, phosphorus, antimony, or bismuth.

Embodiment 9: The method of embodiment 1 or 2, wherein the dopant is an oxide of magnesium, manganese, or tin.

Embodiment 10: The method of embodiment 1 or 2, wherein the dopant is an oxide of manganese.

Embodiment 11: The method of any one of embodiments 1-10, wherein the PGM component comprises palladium, platinum, rhodium, rhenium, ruthenium, iridium, or a combination thereof.

Embodiment 12: The method of any one of embodiments 1-11, wherein the PGM component comprises palladium, platinum, or a mixture thereof.

Embodiment 13: The method of any one of embodiments 1-12, wherein the predetermined temperature for releasing the stored $NO_x$ is above about 200° C.

Embodiment 14: The method of any one of embodiments 1-13, wherein the predetermined temperature for releasing the stored $NO_x$ is a temperature range of from about 200, about 225, about 250, or about 275, to about 300, about 325, about 350, about 400 or about 450° C.

Embodiment 15: The method of any one of embodiments 1-14, wherein the LT-NA component comprises: a substrate; and one or more washcoats comprising the LT-NA composition disposed on at least a portion of the substrate.

Embodiment 16: The method of embodiment 15, wherein the one or more washcoats are coated on the substrate in a layered or zoned configuration.

Embodiment 17: The method of embodiment 15 or 16, wherein the substrate is a wall-flow or flow-through substrate.

Embodiment 18: The method of any one of embodiments 1-17, wherein treating the exhaust gas stream further comprises selectively removing at least a portion of $NO_x$ in the gaseous exhaust stream.

Embodiment 19: The method of any one of embodiments 1-17, wherein treating the exhaust gas stream further comprises adjusting the distribution of nitric oxide (NO) and nitrogen dioxide ($NO_2$) in the gaseous exhaust stream.

Embodiment 20: The method of any one of embodiments 1-19, wherein the LT-NA component is effective for storing one or more of NO and $NO_2$ at a temperature below about 200° C., and releasing one or both of NO and $NO_2$ at a predetermined temperature.

Embodiment 21: The method of embodiment 20, wherein the predetermined temperature for releasing NO, $NO_2$, or both, is above about 200° C.

Embodiment 22: The method of embodiment 20 or 21, wherein the predetermined temperature for releasing NO, $NO_2$, or both is a temperature range of from about 200, about 225, about 250, or about 275, to about 300, about 325, about 350, about 400 or about 450° C.

Embodiment 23: The method of any one of embodiments 1-22, wherein the LT-NA component is effective for releasing one or both of NO and NO2 at a temperature above about 300° C.

Embodiment 24: The method of any one of embodiments 1-23, wherein the LT-NA component is effective for releasing one or both of NO and NO2 at a temperature above about 325° C.

Embodiment 25: The method of any one of embodiments 1-24, wherein contacting the gaseous exhaust stream with a LT-NA component comprises: continually passing the exhaust gas stream into contact with the LT-NA component, the exhaust gas stream being at an initial temperature at or below about 150° C. and progressively warming during further engine operation; adsorbing and storing the $NO_x$ from the exhaust gas stream until the exhaust gas stream reaches a predetermined temperature, wherein the $NO_x$ is released into the exhaust gas stream exiting the LT-NA component; and continually passing the exhaust gas stream exiting the LT-NA component into contact with at least one downstream catalytic material for further oxidation of nitric oxide or for reduction of nitric oxide and nitrogen dioxide as the exhaust gas stream increases in temperature and heats each such downstream catalytic material to an operating temperature of between about 200 and about 450° C.

Embodiment 26: The method of any one of embodiments 1-25, further comprising injecting ammonia or an ammonia precursor into the exhaust stream downstream from the LT-NA component and upstream from a selective catalytic reduction (SCR) catalyst article, wherein the timing and duration of said injecting is modulating according to the $NO_x$ release profile of the LT-NA component.

Embodiment 27: A method for modulating one or both of a $NO_x$ adsorption/desorption profile of a LT-NA composition and a $NO_x$ desorption temperature range of a LT-NA composition, the LT-NA composition comprising: a rare earth metal component; a platinum group metal (PGM) component; and a dopant selected from a transition metal oxide, an alkaline earth metal oxide, an oxide of an element of any of groups 13-15 of the periodic table, or a combination thereof; wherein the PGM component and the dopant are disposed on or impregnated in the rare earth metal component; the method comprising selecting the dopant and selecting the loading of the rare earth metal component, the PGM component, and the dopant.

Embodiment 28: The method of embodiment 27, wherein the rare earth metal component comprises ceria.

Embodiment 29: The method of embodiment 27 or 28, wherein the $NO_x$ desorption temperature range is from about 150, about 175, about 200, about 225, or about 250, to about 275, about 300, about 325, about 350, or about 400° C.

Embodiment 30: The method of any one of embodiments 27-29, wherein NO is desorbed over a temperature range of from about 150, about 175, about 200, about 225, or about 250, to about 275, about 300, about 325, about 350, or about 400° C.

Embodiment 31: The method of any one of embodiments 27-30, wherein $NO_2$ is desorbed over a temperature range of from about 150, about 175, about 200, about 225, or about 250, to about 275, about 300, about 325, about 350, or about 400° C.

Embodiment 32: The method of any one of embodiments 27-31, wherein modulating the $NO_x$ adsorption/desorption profile comprises adjusting the ratio of NO to $NO_2$ desorbed at a given temperature over the NOx desorption temperature range of the LT-NA composition.

Embodiment 33: A low-temperature $NO_x$ adsorber (LT-NA) composition comprising: a rare earth metal component; a platinum group metal (PGM) component; and a dopant selected from a transition metal oxide, an alkaline earth metal oxide, an oxide of an element of any of groups 13-15 of the periodic table, or a combination thereof; wherein the PGM and the dopant are disposed on or impregnated in the rare earth metal component; and wherein the LT-NA composition is effective for storing the NOx at temperatures below 200° C., and releasing the stored $NO_x$ at a predetermined temperature.

Embodiment 34: The LT-NA composition of embodiment 33, wherein the rare earth metal component comprises ceria.

Embodiment 35: A low-temperature NOx adsorber (LT-NA) article comprising: a substrate; and one or more washcoats comprising the LT-NA composition of embodiment 33 or 34 disposed on at least a portion of the substrate.

Embodiment 36: The LT-NA article of embodiment 35, wherein the one or more washcoats are coated on the substrate in a layered or zoned configuration.

Embodiment 37: The LT-NA article of embodiment 35 or 36, wherein the substrate is a wall-flow or flow-through substrate.

These and other features, aspects, and advantages of the disclosure will be apparent from the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, in which reference numerals refer to components of exemplary embodiments of the invention. The drawings are exemplary only, and should not be construed as limiting the invention. The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

Figure 1B:
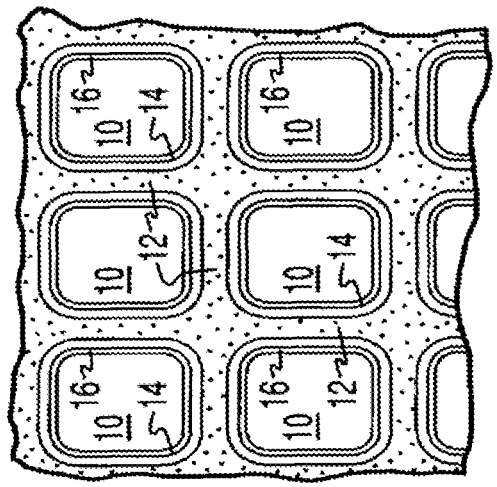
FIG. 1B is a partial cross-sectional view enlarged relative to Fig. 1A and taken along a plane parallel to the end faces of the substrate of FIG. 1A, which shows an enlarged view of a plurality of the gas flow passages shown in FIG. 1A, in an embodiment wherein the substrate is a flow-through substrate.

DETAILED DESCRIPTION OF THE INVENTION $NO_x$ adsorption can be divided into two categories: nitric oxide (NO) and nitrogen dioxide ($NO_2$) adsorption. As stated above, a new class of $NO_x$ adsorption/release materials is needed. Surprisingly, according to the present disclosure, it has been found that the adsorption/desorption properties of a low-temperature $NO_x$ adsorber (LT-NA) composition comprising a rare earth metal component, a platinum group metal (PGM) component, and a dopant, wherein the PGM and the dopant are disposed on or impregnated in the rare earth metal component, may be modulated by selecting the dopant and selecting the loading of the rare earth metal component, the PGM component, and the dopant.

Accordingly, the present disclosure generally provides LT-NA compositions, components, and methods that can narrow the temperature range for the adsorption and subsequent thermal release of $NO_x$, e.g., to suit specific vehicle requirements, and can also adjust the distributions of NO and $NO_2$ components of $NO_x$ from engine exhaust to promote downstream SCR function.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

Definitions

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±5%, ±4%, ±3%, ±2%, ±1%, ±0.5%, ±0.4%, ±0.3%, ±0.2%, ±0.1% or ±0.05%. All numeric values are modified by the term "about" whether or not explicitly indicated. Numeric values modified by the term "about" include the specific identified value. For example, "about 5.0" includes 5.0.

The term "abatement" means a decrease in the amount, caused by any means.

The term "adsorbent" refers to a material that adsorbs and/or absorbs a desired substance, in this disclosure a $NO_x$. Adsorbents may advantageously adsorb and/or absorb (store) a substance at a certain temperature and desorb (release) the substance at a higher temperature.

The term "associated" means for instance "equipped with", "connected to" or in "communication with", for example "electrically connected" or in "fluid communication with" or otherwise connected in a way to perform a function. The term "associated" may mean directly associated with or indirectly associated with, for instance through one or more other articles or elements.

"Average particle size" is synonymous with D50, meaning half of the population of particles has a particle size above this point, and half below. Particle size refers to primary particles. Particle size may be measured by laser light scattering techniques, with dispersions or dry powders, for example according to ASTM method D4464.

The term "catalyst" refers to a material that promotes a chemical reaction. The catalyst includes the "catalytically active species" and the "support" that carries or supports the active species. For example, zeolites are supports for palladium active catalytic species. Likewise, refractory metal oxide particles may be a support for platinum group metal catalytic species. The catalytically active species are also termed "promoters" as they promote chemical reactions. For instance, a present palladium-containing rare earth metal component may be termed a Pd-promoted rare earth metal component. A "promoted rare earth metal component" refers to a rare earth metal component to which catalytically active species are intentionally added.

The term "catalytic article" in the invention means an article comprising a substrate having a catalyst coating composition.

The term "configured" as used in the description and claims is intended to be an open-ended term as are the terms "comprising" or "containing." The term "configured" is not meant to exclude other possible articles or elements. The term "configured" may be equivalent to "adapted."

"Crystal size" as used herein means the length of one edge of a face of the crystal, preferably the longest edge, provided that the crystals are not needle-shaped. Direct measurement of the crystal size can be performed using microscopy methods, such as SEM and TEM. For example, measurement by SEM involves examining the morphology of materials at high magnifications (typically 1000× to 10,000×). The SEM method can be performed by distributing a representative portion of the zeolite powder on a suitable mount such that individual particles are reasonably evenly spread out across the field of view at 1000× to 10,000× magnification. From this population, a statistically significant sample of random individual crystals (e.g., 50-200) are examined and the longest dimensions of the individual crystals parallel to the horizontal line of the straight edge are measured and recorded. Particles that are clearly large polycrystalline aggregates are not to be included in the measurements. Based on these measurements, the arithmetic mean of the sample crystal sizes is calculated.

"CSF" refers to a catalyzed soot filter, which is a wall-flow monolith. A wall-flow filter consists of alternating inlet channels and outlet channels, where the inlet channels are plugged on the outlet end and the outlet channels are plugged on the inlet end. A soot-carrying exhaust gas stream entering the inlet channels is forced to pass through the filter walls before exiting from the outlet channels. In addition to soot filtration and regeneration, A CSF may carry oxidation catalysts to oxidize CO and HC to $CO_2$ and $H_2O$, or oxidize NO to $NO_2$ to accelerate the downstream SCR catalysis or to facilitate the oxidation of soot particles at lower temperatures. An SCR catalyst composition can also be coated directly onto a wall-flow filter, which is called a SCRoF.

"DOC" refers to a diesel oxidation catalyst, which converts hydrocarbons and carbon monoxide in the exhaust gas of a diesel engine. Typically, a DOC comprises one or more platinum group metals such as palladium and/or platinum; a support material such as alumina; a zeolite for HC storage; and optionally, promoters and/or stabilizers.

In general, the term "effective" means for example from about 35% to 100% effective, for instance from about 40%, about 45%, about 50% or about 55% to about 60%, about 65%, about 70%, about 75%, about 80%, about 85%, about 90% or about 95%, regarding the defined catalytic activity or storage/release activity, by weight or by moles.

The term "exhaust stream" or "exhaust gas stream" refers to any combination of flowing gas that may contain solid or liquid particulate matter. The stream comprises gaseous components and is for example exhaust of a lean burn engine, which may contain certain non-gaseous components such as liquid droplets, solid particulates and the like. The exhaust gas stream of a combustion engine typically further comprises combustion products ($CO_2$ and $H_2O$), products of incomplete combustion (carbon monoxide (CO) and hydrocarbons (HC)), oxides of nitrogen ($NO_x$), combustible and/or carbonaceous particulate matter (soot), and un-reacted oxygen and nitrogen. As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine. The inlet end of a substrate is synonymous with the "upstream" end or "front" end. The outlet end is synonymous with the "downstream" end or "rear" end. An upstream zone is upstream of a downstream zone. An upstream zone may be closer to the engine or manifold, and a downstream zone may be further away from the engine or manifold.

The term "in fluid communication" is used to refer to articles positioned on the same exhaust line, i.e., a common exhaust stream passes through articles that are in fluid communication with each other. Articles in fluid communication may be adjacent to each other in the exhaust line. Alternatively, articles in fluid communication may be separated by one or more articles, also referred to as "washcoated monoliths."

The term "functional article" in the invention means an article comprising a substrate having a functional coating composition disposed thereon, in particular a catalyst and/or sorbent coating composition.

As used herein, "impregnated" or "impregnation" refers to permeation of the catalytic material into the porous structure of the support material.

The terms "on" and "over" in reference to a coating layer may be used synonymously. The term "directly on" means in direct contact with. The disclosed articles are referred to in certain embodiments as comprising one coating layer "on" a second coating layer, and such language is intended to encompass embodiments with intervening layers, where direct contact between the coating layers is not required (i.e., "on" is not equated with "directly on").

As used herein, the term "promoted" refers to a component that is intentionally added to the rare earth metal component, as opposed to impurities inherent in the rare earth metal component. "Promoters" are metals that enhance activity toward a desired chemical reaction or function.

As used herein, the terms "nitrogen oxides" or "$NO_x$" designate the oxides of nitrogen, such as NO, $NO_2$ or $N_2O$.

As used herein, the term "stream" broadly refers to any combination of flowing gas that may contain solid or liquid particulate matter. The term "gaseous stream" or "exhaust gas stream" means a stream of gaseous constituents, such as the exhaust of a combustion engine, which may contain entrained non-gaseous components such as liquid droplets, solid particulates, and the like. The exhaust gas stream of a combustion engine typically further comprises combustion products ($CO_2$ and $H_2O$), products of incomplete combustion (carbon monoxide (CO) and hydrocarbons (HC)), oxides of nitrogen ($NO_x$), combustible and/or carbonaceous particulate matter (soot), and un-reacted oxygen and nitrogen.

"Substantially free" means "little or no" or "no intentionally added" and also having only trace and/or inadvertent amounts. For instance, in certain embodiments, "substantially free" means less than 2 wt % (weight %), less than 1.5 wt %, less than 1.0 wt %, less than 0.5 wt %, 0.25 wt % or less than 0.01 wt %, based on the weight of the indicated total composition.

As used herein, the term "substrate" refers to the monolithic material onto which the catalyst composition, that is, catalytic coating, is disposed, typically in the form of a washcoat. In one or more embodiments, the substrates are flow-through monoliths and monolithic wall-flow filters. Flow-through and wall-flow substrates are also taught, for example, in International Application Publication No. WO2016/070090, which is incorporated herein by reference. A washcoat is formed by preparing a slurry containing a specified solids content (e.g., 30-90% by weight) of catalyst in a liquid, which is then coated onto a substrate and dried to provide a washcoat layer. Reference to "monolithic substrate" means a unitary structure that is homogeneous and continuous from inlet to outlet. A washcoat is formed by preparing a slurry containing a certain solid content (e.g., 20%-90% by weight) of particles in a liquid vehicle, which is then coated onto a substrate and dried to provide a washcoat layer.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

As used herein, the term "washcoat" has its usual meaning in the art of a thin, adherent coating of a catalytic or other material applied to a substrate material, such as a honeycomb-type substrate, which is sufficiently porous to permit the passage of the gas stream being treated. As used herein and as described in Heck, Ronald and Farrauto, Robert, Catalytic Air Pollution Control, New York: Wiley-Interscience, 2002, pp. 18-19, a washcoat layer includes a compositionally distinct layer of material disposed on the surface of a monolithic substrate or an underlying washcoat layer. A substrate can contain one or more washcoat layers, and each washcoat layer can be different in some way (e.g., may differ in physical properties thereof such as, for example particle size or crystallite phase) and/or may differ in the chemical catalytic functions.

"Weight percent (wt %)," if not otherwise indicated, is based on an entire composition free of any volatiles, that is, based on dry solids content. Unless otherwise indicated, all parts and percentages are by weight.

All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods. All U.S. patent applications, Pre-Grant publications and patents referred to herein are hereby incorporated by reference in their entireties.

In a first aspect is provided a method for treating a gaseous exhaust stream comprising a mixture of nitrogen oxides ($NO_x$) flowing from the exhaust manifold of a diesel engine or a lean-burn gasoline engine during a period following a cold-start of the engine, the method comprising contacting the gaseous exhaust stream with a low-temperature $NO_x$ adsorber (LT-NA) component, the LT-NA component disposed downstream of and in fluid communication with the exhaust manifold. Such LT-NA components are effective for storing the $NO_x$ at temperatures below 200° C., and releasing the stored $NO_x$ at a predetermined temperature. Further provided are methods for modulating one or both of a $NO_x$ adsorption/desorption profile of a LT-NA composition and a $NO_x$ desorption temperature range of a LT-NA composition.

LT-NA Composition

The LT-NA composition of the present disclosure comprises a rare earth metal component, a platinum group metal (PGM) component, and a dopant selected from a transition metal oxide, an alkaline earth metal oxide, an oxide of an element of any of groups 13-15 of the periodic table, or a combination thereof. The PGM and the dopant are disposed on or impregnated in the rare earth metal component. The individual components comprising the LT-NA composition are disclosed herein below.

Rare Earth Metal Component

As referenced above, the LT-NA composition disclosed herein comprises a rare earth metal component. The term "rare earth metal component" refers to metals of the lanthanide series as defined in the Periodic Table of Elements, typically in the form of an oxide. Lanthanide series metals include cerium, praseodymium, neodymium, promethium, samarium, europium, gadolinium, terbium, dysprosium, holmium, erbium, thulium, ytterbium, and lutetium. Particularly suitable rare earth metal components include oxides of one or more of lanthanum, cerium, neodymium, yttrium, praseodymium, and mixtures thereof. These may include various oxidation states of the rare earth metal, such as monoxide, dioxide, trioxide, tetroxide, and the like, depending on the valence of the particular transition metal. In some embodiments, the rare earth metal component comprises cerium oxide ($CeO_2$; ceria). In some embodiments, the rare earth metal component is ceria.

Platinum Group Metal (PGM) Component

As referenced above, the LT-NA composition disclosed herein comprises a platinum group metal (PGM) component. The term "PGM component" refers to any component that includes a PGM (e.g., Ru, Rh, Os, Ir, Pd, Pt and/or Au). Reference to "PGM component" allows for the presence of the PGM in any valence state. For example, the PGM may be in metallic form, with zero valence, or the PGM may be in an oxide form. The terms "platinum (Pt) component," "rhodium (Rh) component," "palladium (Pd) component," "iridium (Ir) component," "ruthenium (Ru) component," and the like refer to the respective platinum group metal compound, complex, or the like which, upon calcination or use of the catalyst, decomposes or otherwise converts to a catalytically active form, usually the metal or the metal oxide. In some embodiments, the PGM component comprises palladium, platinum, rhodium, rhenium, ruthenium, iridium, or a combination thereof. In some embodiments, the PGM component comprises palladium, platinum, or a mixture thereof. In some embodiments, the PGM component is palladium. In some embodiments, the PGM component is platinum.

The PGM component may be present in an amount in the range of about 0.01 to about 5% or about 0.1 to about 3% by weight on a metal basis, based on the weight of the rare earth metal component. In some embodiments, the PGM is present at about 0.5 to about 2.5% by weight (e.g., about 2% by weight) of the rare earth metal component.

Dopant

As referenced above, the LT-NA composition disclosed herein comprises a dopant. The dopant may be selected from a transition metal oxide, an alkaline earth metal oxide, an oxide of an element of any of groups 13-15 of the periodic table, or a combination thereof In some embodiments, the dopant is a transition metal oxide. As used herein, the term "transition metal oxide" refers to any oxide of a transition metal. These oxides may include various oxidation states of the transition metal, such as monoxide, dioxide, trioxide, tetroxide, and the like, depending on the valence of the particular transition metal. As used herein, the term "transition metal" refers to any element in the d-block of the periodic table, which includes groups 3 to 12 on the periodic table. Transition metals include, e.g., scandium, titanium, vanadium, chromium, manganese, iron, cobalt, nickel, copper, zinc, yttrium, zirconium, niobium, molybdenum, technetium, ruthenium, rhodium, silver, cadmium, lanthanum, hafnium, tantalum, tungsten, rhenium, osmium, iridium, platinum, silver, gold, and mercury. Particularly suitable transition metals for use as a dopant as disclosed herein include one or more of chromium, manganese, iron, cobalt, nickel, copper, zinc, molybdenum, tungsten. In some embodiments, the transition metal oxide is an oxide of manganese. In some embodiments, the transition metal oxide is a manganese oxide selected from the group consisting of MnO, $MnO_2$, $Mn_2O_3$, and mixtures thereof.

In some embodiments, the dopant is an alkaline earth metal oxide. As used herein, the term "alkaline earth metal oxide" refers to Group II metal oxides. In some embodiments, the alkaline earth metal oxide is selected from the group consisting of oxides of barium, calcium, magnesium, strontium, and mixtures thereof. In some embodiments, the alkaline earth metal oxide is an oxide of barium, calcium, or magnesium. In some embodiments, the alkaline earth metal oxide is an oxide of magnesium.

In some embodiments, the dopant is an oxide of an element of any of groups 13-15 of the periodic table. As used herein, the term "an oxide of an element of any of groups 13-15 of the periodic table" refers to any oxide of an element of any of groups 13-15 of the periodic table. These may include various oxidation states of the element, such monoxide, dioxide, trioxide, tetroxide, and the like depending on the valence of the particular element. By "element of any of groups 13-15 of the periodic table" is meant any element falling within groups 13, 14, or 15 as described in the periodic table, for example, boron, aluminum, gallium, indium, thallium, carbon, silicon, germanium, tin, lead, nitrogen, phosphorus, arsenic, antimony, bismuth, oxygen, sulfur, selenium, and tellurium. Particularly suitable elements of groups 13-15 of the periodic table for use as a dopant as disclosed herein include one or more of boron, silicon, tin, phosphorus, antimony, bismuth, and mixtures thereof. In some embodiments, the oxide of an element of any of groups 13-15 of the periodic table is selected from the group consisting of an oxide of boron, silicon, tin, phosphorus, antimony, bismuth, and mixtures thereof. In some embodiments, the oxide of an element of any of groups 13-15 of the periodic table is an oxide of tin.

In some embodiments, the total amount of the dopant metal ranges from about 0.1% to about 10%, or from about 0.5% to about 5% by weight based on the weight of the rare earth metal component (e.g., less than 10%, less than 9%, less than 8%, less than 7%, less than 6%, less than 5%, less than 4%, less than 3%, less than 2%, less than 1%, or less than 0.5% by weight based on the weight of the rare earth metal component). In some embodiments, the dopant is present in an amount of about 0.5% by weight based on the weight of the rare earth metal component. In some embodiments, the dopant is present in an amount of about 1% by weight based on the weight of the rare earth metal component. In some embodiments, the dopant is present in an amount of about 2% by weight based on the weight of the rare earth metal component. In some embodiments, the dopant is present in an amount of about 5% by weight based on the weight of the LT-NA composition.

While the foregoing description provides several suitable ranges or amounts for the PGM component and dopant components of the LT-NA composition, it should be noted that each disclosed range or amount for one of these components may be combined with a disclosed range or amount for the other components to form new ranges or sub-ranges. Such embodiments are also expressly contemplated by the invention.

Preparation of the LT-NA Composition

The preparation of the LT-NA composition as described herein generally comprises treating (impregnating) the rare earth metal oxide in particulate form with a solution comprising a PGM component and a dopant, either individually or as a mixture. The disclosed LT-NA composition may, in some embodiments, be prepared via an incipient wetness impregnation method. Incipient wetness impregnation techniques, also called capillary impregnation or dry impregnation, are commonly used for the synthesis of heterogeneous materials, i.e., catalysts. Typically, a metal precursor (e.g., a PGM component or a dopant, or both, as disclosed herein) is dissolved in an aqueous or organic solution and then the metal-containing solution is added to the material to be impregnated (e.g., the rare earth metal oxide), and which contains the same pore volume as the volume of the solution that was added. Capillary action draws the solution into the pores of the material. Solution added in excess of the material pore volume causes the solution transport to change from a capillary action process to a diffusion process, which is much slower. The impregnated material can then be dried and calcined to remove the volatile components within the solution, depositing the active species (e.g., the metal or an oxide thereof) on the surface of the material. The maximum loading is limited by the solubility of the precursor in the solution. The concentration profile of the impregnated material depends on the mass transfer conditions within the pores during impregnation and drying.

In some embodiments, the PGM component is impregnated in or disposed on the rare earth metal component. The PGM component may be introduced into or onto the rare earth metal oxide by any suitable means, for example, incipient wetness, co-precipitation, or other methods known in the art. In some embodiments, a suitable method of impregnated the PGM in or disposing the PGM on the rare earth metal component is to prepare a mixture of a solution of a desired PGM precursor (e.g., a platinum compound and/or a palladium compound), and a rare earth component to produce a slurry. Non-limiting examples of suitable PGM precursors include palladium nitrate, tetraammine palladium nitrate, tetraammine platinum acetate, and platinum nitrate. During the calcination steps, or at least during the initial phase of use of the composite, such compounds are converted into a catalytically active form of the metal or a compound thereof. In one or more embodiments, the slurry is acidic, having, for example, a pH of about 2 to less than about 7. The pH of the slurry may be lowered by the addition of an adequate amount of an inorganic acid or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. In some embodiments, the slurry is dried and calcined to provide a PGM-rare earth metal component catalyst powder. In some embodiments, the catalyst powder comprises ceria having Pd impregnated or disposed there on. The PGM component may be described as dispersed in, impregnated in, disposed on, or contained in the rare earth metal oxide.

In some embodiments, in a second step, the dopant is impregnated in or disposed on the PGM-containing rare earth metal component catalyst powder. In some embodiments, a suitable method of impregnated the dopant in or disposing the dopant on the PGM-containing rare earth metal component is to prepare a mixture of a solution of a desired dopant precursor. Non-limiting examples of suitable dopant precursors include salts of alkaline earth metals, salts of transition metals, and salts of group 13-15 elements. Suitable salts include, for example, nitrate, acetate, sulfate, chloride, and the like. During the calcination steps, or at least during the initial phase of use of the composite, such compounds are converted into the active form of the metal or a compound thereof, for example, an oxide. In one or more embodiments, the slurry is acidic, having, for example, a pH of about 2 to less than about 7. The pH of the slurry may be lowered by the addition of an adequate amount of an inorganic acid or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. In some embodiments, the slurry is dried and calcined to provide a PGM-rare earth metal oxide-dopant catalyst powder. In some embodiments, the catalyst powder comprises ceria impregnated with Pd and any one of magnesium, manganese, or tin. The dopant may be described as dispersed in, impregnated in, disposed on, or contained in the rare earth metal oxide. In some embodiments, the order of steps may be reversed, such that the dopant is introduced to the rare earth metal oxide first, followed by the PGM component. The dopant may be introduced into or onto the rare earth metal oxide by any suitable means, for example, incipient wetness, co-precipitation, or other methods known in the art.

In some embodiments, the same method is used to introduce each of the PGM component and the dopant. In some embodiments, the PGM component and the dopant are each introduced using a separate and distinct method. In some embodiments, the PGM component and the dopant are both impregnated in or disposed on the rare earth metal component in the same step (e.g., the PGM precursor and the dopant precursor are combined in one solution and added to the rare earth metal component, for example, by co-impregnation).

LT-NA Component

In one or more embodiments, the present LT-NA compositions are disposed (coated) on a substrate to form a LT-NA component (i.e., a catalytic article). Such components are part of an exhaust gas treatment system (e.g., catalyst articles including, but not limited to, articles including the LT-NA compositions disclosed herein). As used herein, the terms catalyst article, catalytic article, and component are synonymous.

Coating Compositions

To produce an LT-NA component, a substrate as disclosed herein is coated with a LT-NA composition as disclosed herein. The coatings are "catalytic coating compositions" or "catalytic coatings." The terms "catalyst composition" and "catalytic coating composition" are synonymous. LT-NA compositions as disclosed herein may be prepared using a binder, for example, a $ZrO_2$ binder derived from a suitable precursor such as zirconyl acetate or any other suitable zirconium precursor such as zirconyl nitrate. Zirconyl acetate binder provides a coating that remains homogeneous and intact after thermal aging, for example, when the catalyst is exposed to high temperatures of at least about 600° C., for example, about 800° C. and higher water vapor environments of about 5% or more. Other potentially suitable binders include, but are not limited to, alumina and silica. Alumina binders include aluminum oxides, aluminum hydroxides and aluminum oxyhydroxides. Aluminum salts and colloidal forms of alumina many also be used. Silica binders include various forms of $SiO_2$, including silicates and colloidal silica. Binder compositions may include any combination of zirconia, alumina and silica. Other exemplary binders include boehemite, gamma-alumina, or delta/theta alumina, as well as silica sol. When present, the binder is typically used in an amount of about 1-5 wt % of the total washcoat loading. Alternatively, the binder can be zirconia-based or silica-based, for example zirconium acetate, zirconia sol or silica sol. When present, the alumina binder is typically used in an amount of about 0.05 $g/in^3$ to about 1 $g/in^3$. In some embodiments, the binder is alumina.

Substrates

Useful substrates are 3-dimensional, having a length and a diameter and a volume, similar to a cylinder. The shape does not necessarily have to conform to a cylinder. The length is an axial length defined by an inlet end and an outlet end.

According to one or more embodiments, the substrate for the disclosed component(s) may be constructed of any material typically used for preparing automotive catalysts and will typically comprise a metal or ceramic honeycomb structure. The substrate typically provides a plurality of wall surfaces upon which the washcoat composition is applied and adhered, thereby acting as a substrate for the catalyst composition.

Ceramic substrates may be made of any suitable refractory material, e.g. cordierite, cordierite-α-alumina, aluminum titanate, silicon titanate, silicon carbide, silicon nitride, zircon mullite, spodumene, alumina-silica-magnesia, zircon silicate, sillimanite, a magnesium silicate, zircon, petalite, α-alumina, an aluminosilicate and the like.

Substrates may also be metallic, comprising one or more metals or metal alloys. A metallic substrate may include any metallic substrate, such as those with openings or "punch-outs" in the channel walls. The metallic substrates may be employed in various shapes such as pellets, corrugated sheet or monolithic foam. Specific examples of metallic substrates include heat-resistant, base-metal alloys, especially those in which iron is a substantial or major component. Such alloys may contain one or more of nickel, chromium, and aluminum, and the total of these metals may advantageously comprise at least about 15 wt % (weight percent) of the alloy, for instance, about 10 to about 25 wt % chromium, about 1 to about 8 wt % of aluminum, and from 0 to about 20 wt % of nickel, in each case based on the weight of the substrate. Examples of metallic substrates include those having straight channels; those having protruding blades along the axial channels to disrupt gas flow and to open communication of gas flow between channels; and those having blades and also holes to enhance gas transport between channels allowing for radial gas transport throughout the monolith. Metallic substrates, in particular, are advantageously employed in certain embodiments in a close-coupled position, allowing for fast heat-up of the substrate and, correspondingly, fast heat up of a catalyst composition coated therein (e.g., a LT-NA composition).

Any suitable substrate for the catalytic articles disclosed herein may be employed, such as a monolithic substrate of the type having fine, parallel gas flow passages extending there through from an inlet or an outlet face of the substrate such that passages are open to fluid flow there through ("flow-through substrate"). Another suitable substrate is of the type have a plurality of fine, substantially parallel gas flow passages extending along the longitudinal axis of the substrate where, typically, each passage is blocked at one end of the substrate body, with alternate passages blocked at opposite end-faces ("wall-flow filter"). Flow-through and wall-flow substrates are also taught, for example, in International Application Publication No. WO2016/070090, which is incorporated herein by reference in its entirety.

In some embodiments, the substrate comprises a honeycomb substrate in the form of a wall-flow filter or a flow-through substrate. In some embodiments, the substrate is a wall-flow filter. Flow-through substrates and wall-flow filters will be further discussed herein below.

Flow-Through Substrates

In some embodiments, the substrate is a flow-through substrate (e.g., a monolithic flow-through substrate, including a monolithic flow-through honeycomb substrate). Flow-through substrates have fine, parallel gas flow passages extending from an inlet end to an outlet end of the substrate such that passages are open to fluid flow. The passages, which are essentially straight paths from their fluid inlet to their fluid outlet, are defined by walls on which a catalytic coating is disposed so that gases flowing through the passages contact the catalytic material. The flow passages of the flow-through substrate are thin-walled channels, which can be of any suitable cross-sectional shape and size such as trapezoidal, rectangular, square, sinusoidal, hexagonal, oval, circular, etc. The flow-through substrate can be ceramic or metallic as described above.

Flow-through substrates can, for example, have a volume of from about 50 in$^3$ to about 1200 in$^3$, a cell density (inlet openings) of from about 60 cells per square inch (cpsi) to about 500 cpsi or up to about 900 cpsi, for example from about 200 to about 400 cpsi and a wall thickness of from about 50 to about 200 microns or about 400 microns.

Figure 1A:
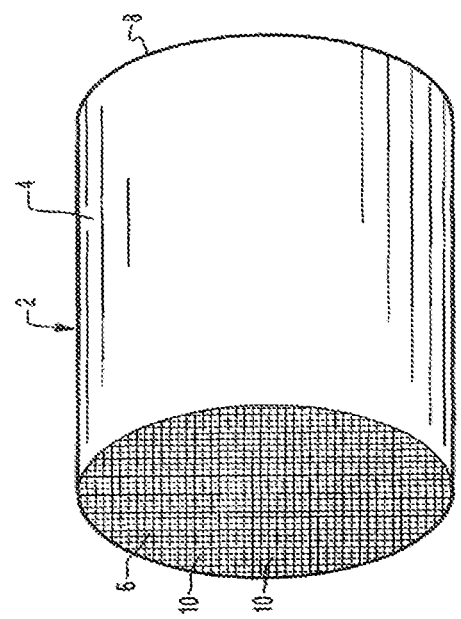
FIG. 1A is a perspective view of a honeycomb-type substrate which may comprise a catalyst composition (i.e., Low-Temperature $NO_x$ adsorber (LT-NA)) washcoat in accordance with the present disclosure.

A LT-NA component can be provided by applying a LT-NA composition coating (e.g., as disclosed herein) to the substrate as a washcoat. FIGS. 1A and 1B illustrate an exemplary substrate 2 in the form of a flow-through substrate coated with a LT-NA composition as described herein. Referring to FIG. 1A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 1B, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 1B, walls 12 are so dimensioned and configured that gas flow passages 10 have a substantially regular polygonal shape. As shown, the LT-NA composition can be applied in multiple, distinct layers if desired. In the illustrated embodiment, the LT-NA composition consists of both a discrete bottom layer 14 adhered to the walls 12 of the carrier member and a second discrete top layer 16 coated over the bottom layer 14. The present invention can be practiced with one or more (e.g., two, three, or four or more) LT-NA composition layers and is not limited to the two-layer embodiment illustrated in FIG. 1B. Further coating configurations are disclosed herein below.

Wall-Flow Filter Substrates

In some embodiments, the substrate is a wall-flow filter, which generally has a plurality of fine, substantially parallel gas flow passages extending along the longitudinal axis of the substrate. Typically, each passage is blocked at one end of the substrate body, with alternate passages blocked at opposite end-faces. Such monolithic wall-flow filter substrates may contain up to about 900 or more flow passages (or "cells") per square inch of cross-section, although far fewer may be used. For example, the substrate may have from about 7 to 600, more usually from about 100 to 400, cells per square inch ("cpsi"). The cells can have cross-sections that are rectangular, square, circular, oval, triangular, hexagonal, or are of other polygonal shapes.

Figure 2:
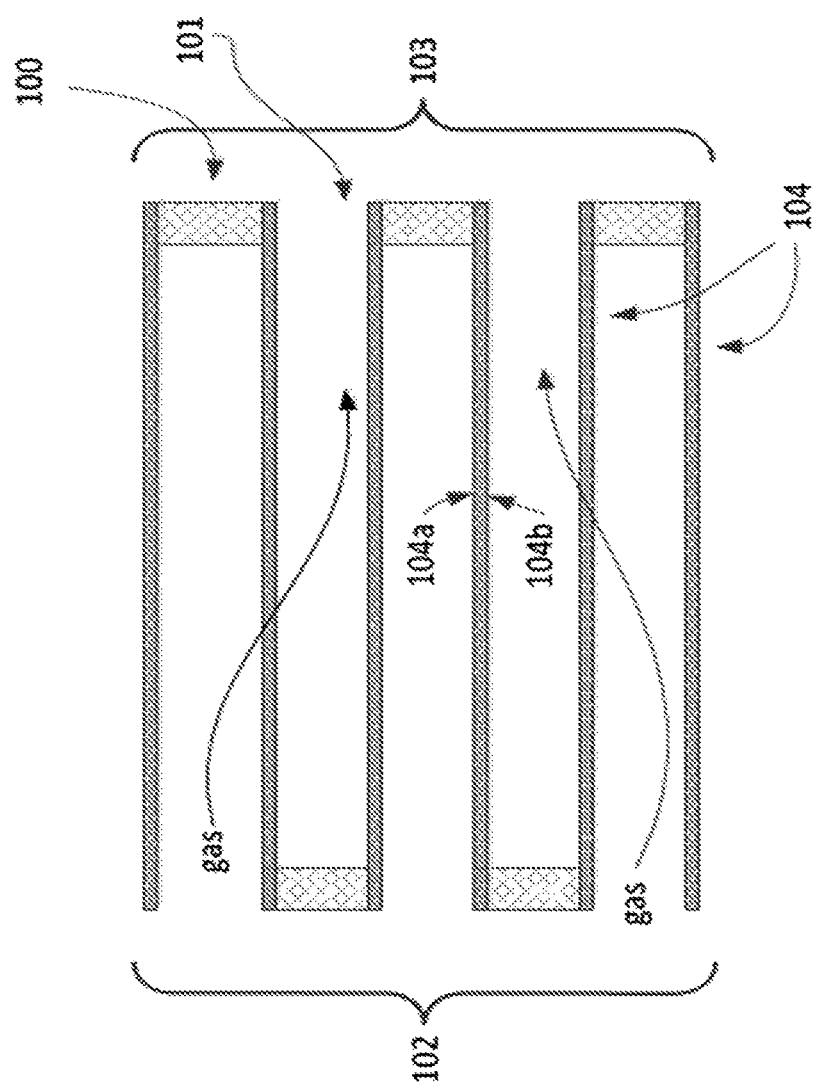
FIG. 2 is a cutaway view of a section enlarged relative to FIG. 1A, wherein the honeycomb-type substrate in FIG. 1A represents a wall-flow filter.

FIG. 2 is a perspective view of an exemplary wall-flow filter. A cross-section view of a monolithic wall-flow filter substrate section is illustrated in FIG. 2, showing alternating plugged and open passages (cells). Blocked or plugged ends 100 alternate with open passages 101, with each opposing end open and blocked, respectively. The filter has an inlet end 102 and outlet end 103. The arrows crossing porous cell walls 104 represent exhaust gas flow entering the open cell ends, diffusion through the porous cell walls 104 and exiting the open outlet cell ends. Plugged ends 100 prevent gas flow and encourage diffusion through the cell walls. Each cell wall will have an inlet side 104a and outlet side 104b. The passages are enclosed by the cell walls.

The wall-flow filter article substrate may have a volume of, for instance, from about 50 cm$^3$, about 100 cm$^3$, about 200 cm$^3$, about 300 cm$^3$, about 400 cm$^3$, about 500 cm$^3$, about 600 cm³, about 700 cm³, about 800 cm³, about 900 cm³ or about 1000 cm³ to about 1500 cm³, about 2000 cm³, about 2500 cm³, about 3000 cm³, about 3500 cm³, about 4000 cm³, about 4500 cm³ or about 5000 cm³. Wall-flow filter substrates typically have a wall thickness from about 50 microns to about 2000 microns, for example from about 50 microns to about 450 microns or from about 150 microns to about 400 microns.

The walls of the wall-flow filter are porous and generally have a wall porosity of at least about 50% or at least about 60% with an average pore size of at least about 5 microns prior to disposition of the functional coating. For instance, the wall-flow filter article substrate in some embodiments will have a porosity of ≥50%, ≥60%, ≥65% or ≥70%. For instance, the wall-flow filter article substrate will have a wall porosity of from about 50%, about 60%, about 65% or about 70% to about 75%, about 80% or about 85% and an average pore size of from about 5 microns, about 10, about 20, about 30, about 40 or about 50 microns to about 60 microns, about 70, about 80, about 90 or about 100 microns prior to disposition of a catalytic coating. The terms "wall porosity" and "substrate porosity" mean the same thing and are interchangeable. Porosity is the ratio of void volume divided by the total volume of a substrate. Pore size may be determined according to ISO15901-2 (static volumetric) procedure for nitrogen pore size analysis. Nitrogen pore size may be determined on Micromeritics TRISTAR 3000 series instruments. Nitrogen pore size may be determined using BJH (Barrett-Joyner-Halenda) calculations and 33 desorption points. Useful wall-flow filters have high porosity, allowing high loadings of catalyst compositions without excessive backpressure during operation.

Coatings

A substrate is coated with a LT-NA composition as disclosed herein to form a LT-NA component. The coating may comprise one or more thin, adherent coating layers disposed on and in adherence to least a portion of a substrate. In some embodiment, the present LT-NA components may include the use of one or more LT-NA composition layers and combinations of one or more LT-NA composition layers. LT-NA compositions may be present on the inlet side of the substrate wall alone, the outlet side alone, both the inlet and outlet sides, or the wall itself may consist all, or in part, of the catalytic material. The LT-NA composition coating may be on the substrate wall surfaces and/or in the pores of the substrate walls, that is "in" and/or "on" the substrate walls. Thus, the phrase "a catalytic coating disposed on the substrate" means on any surface, for example on a wall surface and/or on a pore surface. The catalytic coating layer(s) may comprise the individual functional components, that is, an LT-NA composition as described herein.

A LT-NA composition may typically be applied in the form of a washcoat, containing support material having the active species thereon (e.g., the $NO_x$ adsorbent components of the LT-NA composition). A washcoat is formed by preparing a slurry containing a specified solids content (e.g., about 10 to about 60% by weight) in a liquid vehicle, which is then applied to a substrate and dried and calcined to provide a coating layer. If multiple coating layers are applied, the substrate is dried and calcined after each layer is applied and/or after the number of desired multiple layers are applied. In one or more embodiments, the catalytic material(s) are applied to the substrate as a washcoat. Binders may also be employed as described above.

The above-noted LT-NA composition(s) are generally independently mixed with water to form a slurry for purposes of coating a catalyst substrate, such as a honeycomb-type substrate. In addition to the catalyst particles, the slurry may optionally contain a binder (e.g., alumina, silica), water-soluble or water-dispersible stabilizers, promoters, associative thickeners, and/or surfactants (including anionic, cationic, non-ionic or amphoteric surfactants). A typical pH range for the slurry is about 3 to about 6. Addition of acidic or basic species to the slurry can be carried out to adjust the pH accordingly. For example, in some embodiments, the pH of the slurry is adjusted by the addition of ammonium hydroxide or aqueous nitric acid.

The slurry can be milled to enhance mixing of the particles and formation of a homogenous material. The milling can be accomplished in a ball mill, continuous mill, or other similar equipment, and the solids content of the slurry may be, e.g., about 20-60 wt %, more particularly about 20-40 wt %. In one embodiment, the post-milling slurry is characterized by a $D_{90}$ particle size of about 10 to about 40 microns, preferably 10 to about 30 microns, more preferably about 10 to about 15 microns.

The slurry is then coated on the substrate using any washcoat technique known in the art. In one embodiment, the substrate is dipped one or more times in the slurry or otherwise coated with the slurry. Thereafter, the coated substrate is dried at an elevated temperature (e.g., 100-150° C.) for a period of time (e.g., 10 min-3 hours) and then calcined by heating, e.g., at 400-600° C., typically for about 10 minutes to about 3 hours. Following drying and calcining, the final washcoat coating layer can be viewed as essentially solvent-free.

After calcining, the washcoat loading obtained by the above described washcoat technique can be determined through calculation of the difference in coated and uncoated weights of the substrate. As will be apparent to those of skill in the art, the loading can be modified by altering the slurry rheology. In addition, the coating/drying/calcining process to generate a washcoat can be repeated as needed to build the coating to the desired loading level or thickness, meaning more than one washcoat may be applied.

The washcoat(s) can be applied such that different coating layers may be in direct contact with the substrate. Alternatively, one or more "undercoats" may be present, so that at least a portion of a catalytic or sorbent coating layer or coating layers are not in direct contact with the substrate (but rather, are in contact with the undercoat). One or more "overcoats" may also be present, so that at least a portion of the coating layer or layers are not directly exposed to a gaseous stream or atmosphere (but rather, are in contact with the overcoat).

Different coating layers may be in direct contact with each other without a "middle" overlapping zone. Alternatively, different coating layers may not be in direct contact, with a "gap" between the two zones. In the case of an "undercoat" or "overcoat" the gap between the different layers is termed an "interlayer." An undercoat is a layer "under" a coating layer, an overcoat is a layer "over" a coating layer and an interlayer is a layer "between" two coating layers. The interlayer(s), undercoat(s) and overcoat(s) may contain one or more functional compositions or may be free of functional compositions.

The catalytic coating may comprise more than one thin adherent layer, the layers in adherence to each other and the coating in adherence to the substrate. The entire coating comprises the individual "coating layers". The catalytic coating may advantageously be "zoned", comprising zoned catalytic layers. This may also be described as "laterally zoned". For example, a layer may extend from the inlet end towards the outlet end extending about 10%, about 20%, about 30%, about 40%, about 50%, about 60%, about 70%, about 80%, or about 90% of the substrate length. Another layer may extend from the outlet end towards the inlet end extending about 10%, about 20%, about 30%, about 40%, about 50%, about 60%, about 70%, about 80%, or about 90% of the substrate length. Different coating layers may be adjacent to each other and not overlay each other. Alternatively, different layers may overlay a portion of each other, providing a third "middle" zone. The middle zone may, for example, extend from about 5% to about 80% of the substrate length, for example about 5%, about 10%, about 20%, about 30%, about 40%, about 50%, about 60% or about 70% of the substrate length.

Different layers may each extend the entire length of the substrate or may each extend a portion of the length of the substrate and may overlay or underlay each other, either partially or entirely. Each of the different layers may extend from either the inlet or outlet end.

Zones of the present disclosure are defined by the relationship of coating layers. With respect to different coating layers, there are a number of possible zoning configurations. For example, there may be an upstream zone and a downstream zone, there may be an upstream zone, a middle zone and a downstream zone, there may be four different zones, etc. Where two layers are adjacent and do not overlap, there are upstream and downstream zones. Where two layers overlap to a certain degree, there are upstream, downstream and middle zones. Where for example, a coating layer extends the entire length of the substrate and a different coating layer extends from the outlet end a certain length and overlays a portion of the first coating layer, there are upstream and downstream zones. The present catalytic coatings may comprise more than one identical layer.

Figure 3A:
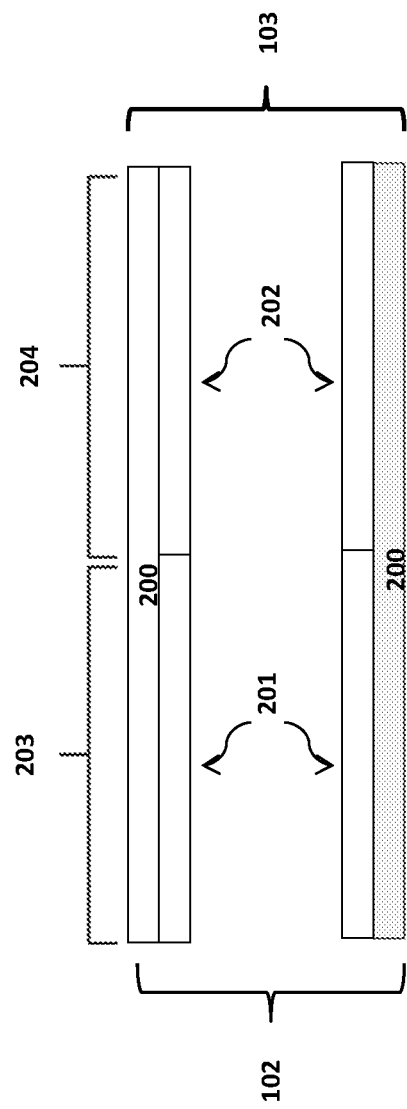
FIG. 3A is a cross-sectional view of an embodiment of a zoned LT-NA component of the present disclosure.
Figure 3B:
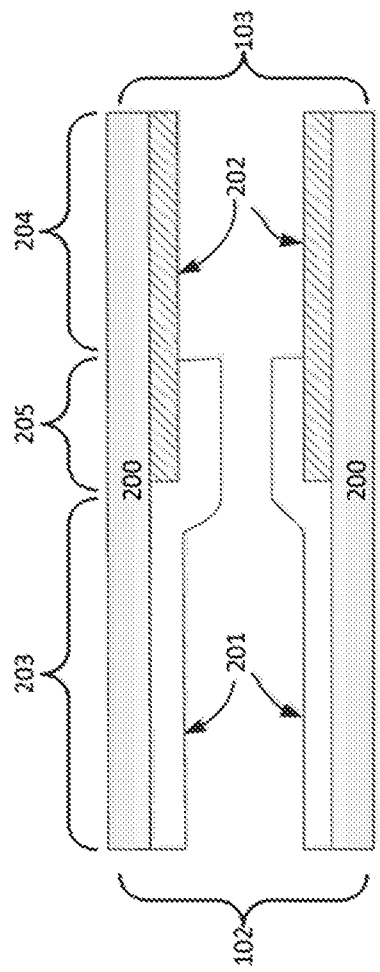
FIG. 3B is a cross-sectional view of another embodiment of a zoned LT-NA component of the present disclosure.
Figure 3C:
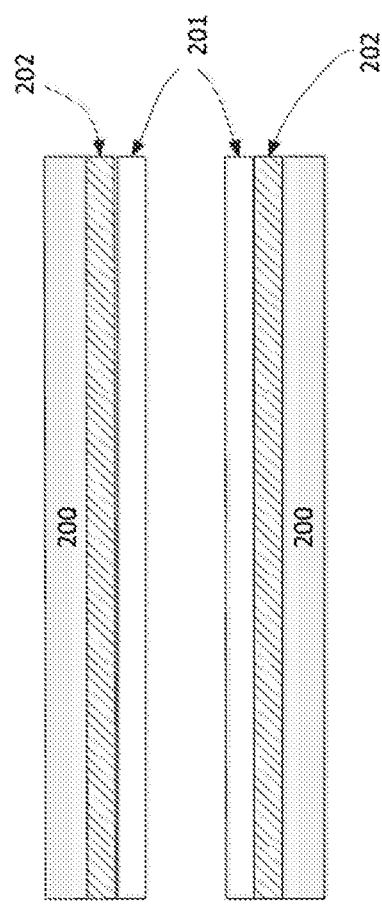
FIG. 3C is a cross-sectional view of a layered LT-NA component of the present disclosure.

FIGS. 3A, 3B and 3C show some possible coating layer configurations with two coating layers (although the disclosure is not limited thereto and the catalysts can comprise any number of layers). Shown are monolithic wall-flow filter substrate walls 200 onto which coating layers 201 and 202 are disposed. This is a simplified illustration, and in the case of a porous wall-flow substrate, not shown are pores and coatings in adherence to pore walls and not shown are plugged ends. In FIG. 3A, coating layer 201 extends from the inlet to the outlet about 50% of the substrate length; and coating layer 202 extends from the outlet to the inlet about 50% of the substrate length and the coating layers are adjacent each other, providing an inlet upstream zone 203 and an outlet downstream zone 204. In FIG. 3B, coating layer 202 extends from the outlet about 50% of the substrate length and layer 201 extends from the inlet greater than 50% of the length and overlays a portion of layer 202, providing an upstream zone 203, a middle zone 205 and a downstream zone 204. In FIG. 3C, coating layers 201 and 202 each extend the entire length of the substrate with layer 201 overlaying layer 202. The substrate of FIG. 3C does not contain a zoned coating configuration. FIGS. 3A, 3B and 3C may be useful to illustrate configurations of coating compositions on the wall-through substrate. FIGS. 3A, 3B and 3C may further be useful to illustrate configurations of coating compositions on the flow-through substrate, as described herein below. Configurations of such coating layers are not limited.

Loading of the present LT-NA coatings on a substrate will depend on substrate properties such as porosity and wall thickness. Typically, wall-flow filter loading will be lower than loadings on a flow-through substrate. Catalyzed wall-flow filters are disclosed, for instance, in U.S. Pat. No. 7,229,597, which is incorporated herein by reference in its entirety. The present LT-NA compositions are generally present on the substrate at a concentration of, for instance, from about 0.3 to 5.5 $g/in^3$, or from about 0.4 $g/in^3$, about 0.5 $g/in^3$, about 0.6 $g/in^3$, about 0.7 $g/in^3$, about 0.8 $g/in^3$, about 0.9 $g/in^3$ or about 1.0 $g/in^3$ to about 1.5 $g/in^3$, about 2.0 $g/in^3$, about 2.5 $g/in^3$, about 3.0 $g/in^3$, about 3.5 $g/in^3$, about 4.0 $g/in^3$, about 4.5 $g/in^3$, about 5.0 $g/in^3$ or about 5.5 $g/in^3$, based on the substrate. Concentration of a LT-NA composition, or any other composition, on a substrate refers to concentration per any one three-dimensional section or zone, for instance any cross-section of a substrate or of the entire substrate.

The present LT-NA component, which can comprise a flow-through or wall-flow filter substrate as disclosed herein, provides desirable $NO_x$ adsorption and desorption properties, for example, adsorbing $NO_x$ at low temperatures and releasing trapped $NO_x$ at elevated temperatures. Preferably, the LT-NA component is effective for storing the $NO_x$ at temperatures below 200° C., and releasing the stored $NO_x$ at a predetermined temperature.

Emission Treatment System

In another aspect of the disclosure is provided an emission treatment system for the treatment of exhaust gas emissions from a diesel engine or a lean burn gasoline engine, the emission treatment system comprising the LT-NA component as disclosed herein. The emission treatment system may further comprise one or more additional catalytic components, such as a diesel oxidation catalyst (DOC), and/or a selective catalytic reduction (SCR) catalyst component. The emission treatment system may also further comprise a soot filter component and/or additional catalyst components.

The relative placement of the various components of the emission treatment system can be varied, however, the LT-NA component of the present disclosure has to be located upstream of any catalytic components responsible for the conversion of $NO_x$ released from the LT-NA component.

The emission treatment system may further comprise a diesel oxidation catalyst (DOC) component. The DOC component may be located, for example, upstream of the SCR component and/or soot filter. A suitable DOC for use in the emission treatment system is able to effectively catalyze the oxidation of CO and HC to carbon dioxide ($CO_2$). Preferably, the DOC is capable of converting at least 50% of the CO or HC component present in the exhaust gas.

In addition to treating the exhaust gas emissions via use of a DOC, emission treatment systems may employ a soot filter for removal of particulate matter. The soot filter may be located upstream or downstream from the DOC, but typically, the soot filter will be located downstream from the DOC. In some embodiments, the soot filter is a catalyzed soot filter (CSF). The CSF may comprise a substrate coated with washcoat particles containing one or more catalysts for burning trapped soot and or oxidizing exhaust gas stream emissions. In general, the soot burning catalyst can be any known catalyst for combustion of soot. For example, the CSF can be coated with one or more high surface area refractory oxides (e.g., an aluminum oxide or ceria-zirconia) for the combustion of CO and unburned hydrocarbons and to some degree particulate matter. The soot burning catalyst can be an oxidation catalyst comprising one or more precious metal catalysts (e.g., platinum and/or palladium).

Emission treatment systems as disclosed herein may further comprise a selective catalytic reduction (SCR) component. The SCR component may be located upstream or downstream of the DOC and/or soot filter. As noted above, the SCR must be located downstream of the LT-NA component disclosed herein. A suitable SCR component for use in the emission treatment system is able to effectively catalyze the reduction of the $NO_x$ exhaust component at temperatures as high as 650° C. In addition, the SCR component must be active for reduction of $NO_x$ even under conditions of low load which typically are associated with lower exhaust temperatures. Preferably, the SCR component is capable of converting at least 50% of the $NO_x$ (e.g., NO) component to $N_2$, depending on the amount of reductant added to the system. Another desirable attribute for the SCR component is that it possesses the ability to catalyze the reaction of $O_2$ with any excess $NH_3$ to form $N_2$, so that $NH_3$ is not emitted to the atmosphere. Useful SCR components used in the emission treatment system should also have thermal resistance to temperatures greater than 650° C. Such high temperatures may be encountered during regeneration of the catalyzed soot filter. Suitable SCR catalyst components are described, for instance, in U.S. Pat. Nos. 4,961,917 and 5,516,497, which are both hereby incorporated by reference in their entirety.

The gaseous exhaust stream to be treated according to the methods disclosed herein may have optionally been treated with at least a DOC and/or CSF component. In addition, the LT-NA component does not need to be located in a separate catalytic component, but can be included in another component, such as the DOC, CSF, or SCR component, wherein the catalytic compositions for each such component are applied to the substrate in a zoned or layered configuration as described herein.

Figure 4A:
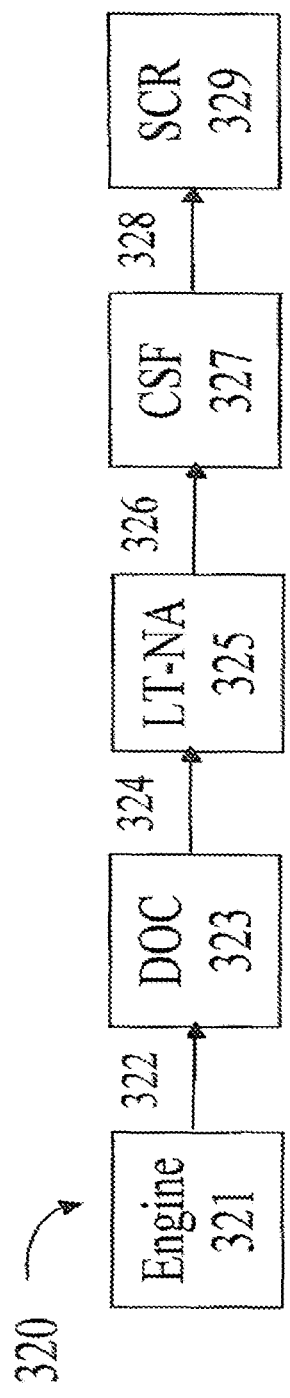
FIG. 4A is a schematic depiction of an embodiment of an emission treatment system comprising a LT-NA component of the present disclosure, wherein the LT-NA component comprising the LT-NA composition is located downstream of a diesel oxidation catalyst (DOC) and upstream of a catalyzed soot filter (CSF) and a selective catalytic reduction (SCR) catalyst component.

Exemplified emission treatment systems may be more readily appreciated by reference to FIGS. 4A-4D, which depict non-limiting schematic representations of exhaust gas treatment systems in accordance with embodiments of the present invention. Referring to FIG. 4A, emission treatment system 320 shows an exhaust gas stream containing gaseous pollutants (e.g., unburned hydrocarbons, carbon monoxide and $NO_x$) and particulate matter is conveyed via line 322 from an engine 321 to a diesel oxidation catalyst (DOC) 323. In the DOC 323, unburned gaseous and non-volatile hydrocarbons and carbon monoxide are largely combusted to form carbon dioxide and water. The exhaust stream is next conveyed via line 324 to a low-temperature $NO_x$ adsorber (LT-NA 325) for the adsorption and/or storage of $NO_x$. The treated exhaust gas stream 326 is next conveyed to a catalyzed soot filter (CSF) 327, which traps particulate matter present within the exhaust gas stream. After removal of particulate matter, via CSF 327, the exhaust gas stream is conveyed via line 328 to a downstream SCR catalyst 329, which provides treatment and/or conversion of $NO_x$. The exhaust gas passes through the SCR component 329 at a flow rate which allows sufficient time for the catalyst composition to reduce the level of $NO_x$ (in combination with a reductant) in the exhaust gas at a given temperature in the exhaust gas before exiting the system.

Figure 4B:
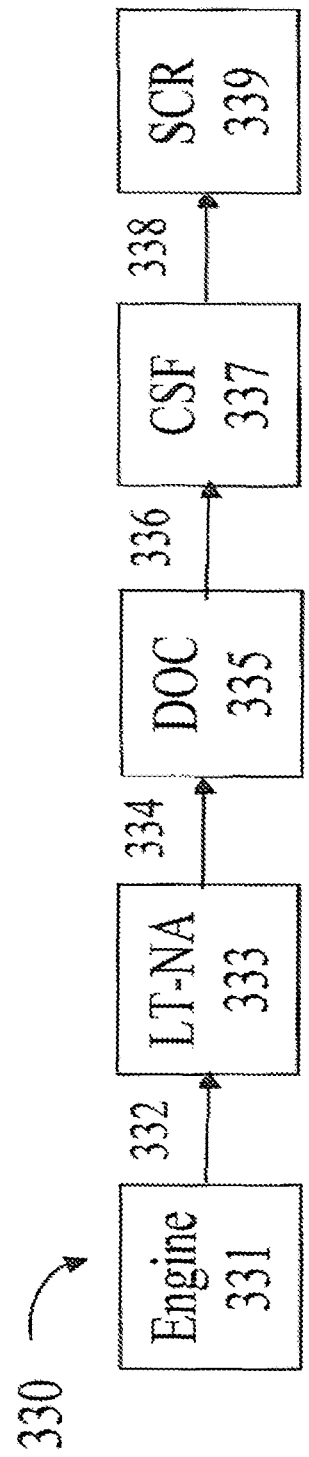
FIG. 4B is a schematic depiction of an embodiment of an emission treatment system comprising a LT-NA component of the present disclosure, wherein the LT-NA component comprising the LT-NA composition is located upstream of a DOC, a CSF, and a SCR catalyst component.

Another embodiment of an exhaust gas treatment system of the invention is shown in FIG. 4B, which depicts a schematic representation of an exhaust gas treatment system 330. Referring to FIG. 4B, an exhaust gas stream is conveyed via line 332 from an engine 331 to a low-temperature $NO_x$ adsorber (LT-NA) 333. Next, the exhaust stream is conveyed via line 334 to a DOC 335 and further conveyed via line 336 to CSF 337. Treated exhaust gas stream 338 is conveyed to SCR 339 before being expelled into the atmosphere.

Figure 4C:
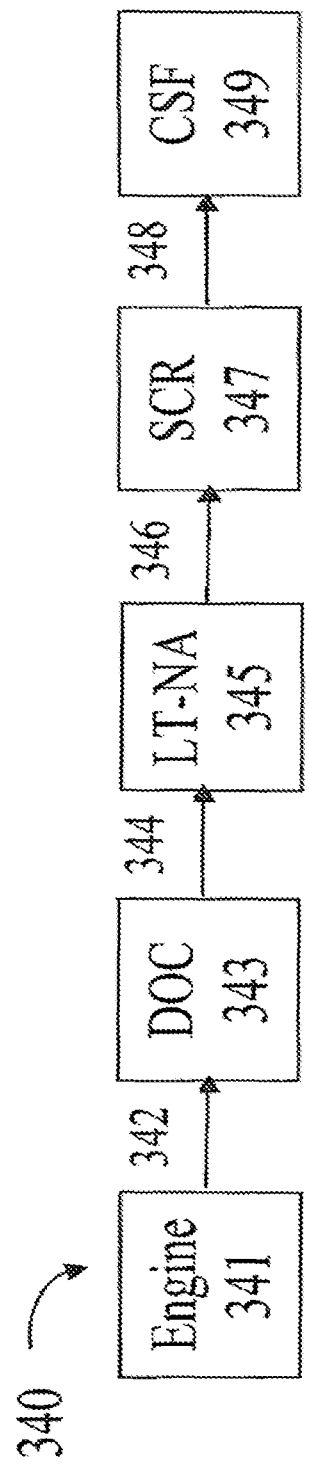
FIG. 4C is a schematic depiction of an embodiment of an emission treatment system comprising a LT-NA component of the present disclosure, wherein the LT-NA component comprising the LT-NA composition is located downstream of a DOC and upstream of a SCR catalyst component, and a CSF.

Another embodiment of an exhaust gas treatment system of the invention is shown in FIG. 4C, which depicts a schematic representation of an emission treatment system 340. Referring to FIG. 4C, an exhaust gas stream is conveyed via line 342 from an engine 341 to a DOC 343 and further via exhaust gas stream 344 to low-temperature $NO_x$ adsorber (LT-NA) 345. Next, the exhaust stream is conveyed via line 346 to a SCR 347 and further conveyed via line 348 to CSF 349. Treated exhaust gas stream 338 is conveyed to SCR 339 before exiting the system.

Figure 4D:
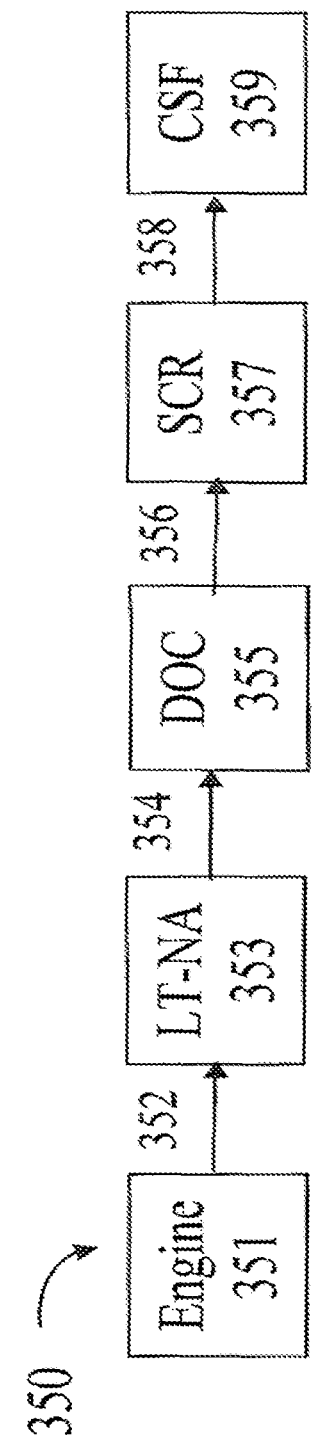
FIG. 4D is a schematic depiction of an embodiment of an emission treatment system comprising a LT-NA component of the present disclosure, wherein the LT-NA component comprising the LT-NA composition is located upstream of a DOC, a SCR catalyst component, and a CSF.

Another embodiment of an exhaust gas treatment system of the invention is shown in FIG. 4D, which depicts a schematic representation of an exhaust gas treatment system 350. Referring to FIG. 4D, an exhaust gas stream is conveyed via line 352 from an engine 351 to a to low-temperature $NO_x$ adsorber (LT-NA) 353 and further via gas exhaust line 354 to DOC 355. Exhaust gas line 356 is conveyed to SCR catalyst 357, the exhaust stream 358 is conveyed to CSF 359 before exiting the system.

Any exemplified emission treatment system depicted by FIGS. 4A-4D may be followed by a selective ammonia oxidation catalyst (AMOx) to remove $NH_3$ released from the SCR and selectively oxidize it to $N_2$. While not illustrated in the emission treatment systems of FIGS. 4A-4D, one of skill in the art will recognize that the presence of an SCR catalyst article in an emission treatment system will require a reductant source and means for introducing the reductant upstream of the SCR catalyst article. Typically, ammonia or an ammonia precursor (e.g., urea) is introduced by an injection article for reaction with $NO_x$ in contact with the SCR catalyst article.

Methods for Treating a Gaseous Exhaust Stream

In one aspect is provided a method for treating a gaseous exhaust stream comprising a mixture of nitrogen oxides ($NO_x$) flowing from the exhaust manifold of a diesel engine or a lean-burn gasoline engine during a period following a cold-start of the engine. Specifically, the method comprises contacting the gaseous exhaust stream with a low temperature $NO_x$ adsorber (LT-NA) component as disclosed herein, disposed downstream of and in fluid communication with the exhaust manifold.

In some embodiments, treating the gaseous exhaust gas stream comprises selectively removing at least a portion of $NO_x$ present in the gaseous exhaust stream. In some embodiments, treating the gaseous exhaust stream comprises adjusting the distribution of nitric oxide (NO) and nitrogen dioxide ($NO_2$) in the gaseous exhaust stream.

In some embodiments, the LT-NA component is effective for releasing one or both of NO and $NO_2$ at a temperature above about 300° C. In some embodiments, the LT-NA component is effective for releasing one or both of NO and $NO_2$ at a temperature above about 325° C.

In some embodiments, contacting the gaseous exhaust stream with an LT-NA component as disclosed herein comprises continually passing the exhaust gas stream into contact with the LT-NA component (e.g., in the form of a catalyst article, which may or may not include other catalyst compositions thereon), the exhaust gas stream being at an initial temperature at or below about 150° C and progressively warming during further engine operation; adsorbing and storing the NOx from the exhaust gas stream until the exhaust gas stream reaches a temperature of about 200° C, wherein the $NO_x$ is released into the exhaust gas stream exiting the LT-NA component; and continually passing the exhaust gas stream exiting the LT-NA component into contact with at least one downstream catalytic material for further oxidation of nitric oxide or for reduction of nitric oxide and nitrogen dioxide as the exhaust gas stream increases in temperature and heats each such downstream catalytic material to an operating temperature. In some embodiments, the operating temperature is between about 200 and about 450° C.

In some embodiments, the method further comprises injecting ammonia or an ammonia precursor (e.g., urea) upstream from a SCR catalyst article, wherein the ammonia or ammonia precursor injection timing, frequency, and duration can be modulated according to the unique $NO_x$ release profile of the upstream LT-NA component as disclosed herein.

Method for Modulating $NO_x$ Adsorption/Desorption Profile and/or a $NO_x$ Desorption Temperature Range of a LT-NA Composition In another aspect is provided a method for modulating one or both of a $NO_x$ adsorption/desorption profile of a LT-NA composition as disclosed herein and a $NO_x$ desorption temperature range of a LT-NA composition as disclosed herein. Surprisingly, it has been found that doping an LT-NA composition comprising a rare earth metal and a PGM component with a dopant (as described in detail above), alters one or both of the $NO_x$ adsorption/desorption profile and/or the $NO_x$ desorption temperature range of the LT-NA composition, providing a "tunable" LT-NA composition. By tuning the $NO_x$ adsorption/desorption profile and/or $NO_x$ desorption temperature range, the LT-NA composition can be tailored to meet an OEM's desired requirements. Thus, $NO_x$ components may be desorbed selectively over various temperature ranges and on demand For example, by varying the identity and concentration of the dopant species, the temperature range over which each of NO and $NO_2$ is adsorbed and released may be modulated, influencing performance of downstream catalytic articles (e.g., an SCR catalyst).

In some embodiments, the $NO_x$ desorption temperature range is from about 150, about 175, about 200, about 225, or about 250, to about 275, about 300, about 325, about 350, or about 400° C. In some embodiments, NO is desorbed over a temperature range of from about 150, about 175, about 200, about 225, or about 250, to about 275, about 300, about 325, about 350, or about 400° C. In some embodiments, $NO_2$ is desorbed over a temperature range of from about 150, about 175, about 200, about 225, or about 250, to about 275, about 300, about 325, about 350, or about 400° C.

In some embodiments, modulating the $NO_x$ adsorption/desorption profile comprises adjusting the ratio of NO to $NO_2$ desorbed at a given temperature over the $NO_x$ desorption temperature range of the LT-NA composition.

The present composition, components, systems, and methods are suitable for treatment of exhaust gas streams from mobile emissions sources such as trucks and automobiles. The present composition, components, systems, and methods are also suitable for treatment of exhaust gas streams from stationary sources such as power plants.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, examples, and preferences herein. All patents and publications cited herein are incorporated by reference herein for the specific teachings thereof as noted, unless other specific statements of incorporation are specifically provided.

EXAMPLES

The present invention is more fully illustrated by the following examples, which are set forth to illustrate the present invention and is not to be construed as limiting thereof. Unless otherwise noted, all parts and percentages are by weight, and all weight percentages are expressed on a dry basis, meaning excluding water content, unless otherwise indicated.

Example 1

Reference Article (2% Pd on $CeO_2$; 1 $g/in^3$)

2% Pd on Ceria Powder Preparation

Palladium nitrate (29 grams) was diluted with 75 grams of de-ionized water. The solution was added onto 300 grams of ceria (CeO2). The mixture was homogenized using a mixer. The resulting powder was dried for 4 hours at 120° C. and calcined for one hour at 500° C.

2% Pd on Ceria Washcoat Slurry Preparation

To 240 grams of de-ionized water was added 200 grams of 2%Pd/$CeO_2$ powder. The slurry was mixed thoroughly with a homogenizer; the pH of the slurry was 4.1. The slurry was milled with a continuous until the resulting slurry had a particle size of about $D_{90}$ of 13 microns and a pH value of about 4.2. Alumina binder was added and the combination mixed thoroughly.

2% Pd on Ceria Core Sample Preparation

Two 1" diameter by 3" long ceramic substrate cores with a cell density of 400 cells per square inch were dipped into the Pd/$CeO_2$/$Al_2O_3$ slurry. The excess slurry was blown off using an air gun. The coated cores were dried at 200° C. with a hot air blower for 5-10 minutes, followed by calcination in an oven for one hour at 500° C. The total washcoat loading for the cores was 1 $g/in^3$.

Core Sample Preparation for Testing

One of the core samples was subjected to an accelerated aging protocol to simulate the in-field use of a vehicle. The aging condition was set at 800° C. for 16 hours under an atmosphere of 10% water, 10% oxygen, and 80% nitrogen. The second core sample was tested without aging.

Example 1a

Reference Article (1% Pd on Ceria; 2 $g/in^3$)

1% Pd on ceria powder preparation

The catalyst powder was prepared according to the procedure of Example 1, but reducing the amount of Pd by half during the powder impregnation.

1% Pd on Ceria Washcoat Slurry Preparation

The washcoat slurry was prepared according to the procedure of Example 1, but substituting 1% Pd on ceria for the 2% Pd on ceria.

2% Pd on Ceria Core Sample Preparation

The catalyst core was prepared according to the procedure for Example 1, but using the 1% Pd on ceria slurry at a washcoat loading of 2 $g/in^3$.

Core Sample Preparation for Testing

The core sample was prepared for testing according to the procedure of Example 1, but using the 1% Pd on ceria with a 2 $g/in^3$ washcoat loading.

Example 1b

Reference Article (2% Pd on Ceria; 2 g/in³)

2% Pd on Ceria Powder Preparation

The catalyst powder was prepared according to the procedure for Example 1.

2% Pd on Ceria Core Sample Preparation

The catalyst core was prepared according to the procedure for Example 1, but using a washcoat loading of 2 g/in³.

Core Sample Preparation for Testing

The core sample was prepared for testing according to the procedure for Example 1, but using the 2% Pd on ceria with a washcoat loading of 2 g/in³.

Example 1c

Reference Article (4% Pd on Ceria; 2 g/in³)

4% Pd on Ceria Powder Preparation

The catalyst powder was prepared according to the procedure for Example 1, but doubling the amount of Pd during the powder impregnation.

4% Pd on Ceria Washcoat Slurry Preparation

The washcoat slurry was prepared according to the procedure for Example 1, but using the 4% Pd on ceria powder.

4% Pd on Ceria Core Sample Preparation

The catalyst core was prepared according to the procedure for Example 1, but using the 4% Pd on ceria powder with a washcoat loading of 2 g/in³.

Core Sample Preparation for Testing

The core sample was prepared for testing according to the procedure for Example 1, but using the 4% Pd on ceria powder with a washcoat loading of 2 g/in³.

Example 2

Inventive Catalytic Article (2% Pd/0.5% Mg/CeO₂)

LT-NA Composition Powder Preparation (2% Pd+0.5% Mg on Ceria)

Ceria powder (283 g) was added to a mix vessel. Palladium nitrate (27.4 g) was mixed with 35 ml of deionized $H_2O$. Magnesium nitrate (6.8 g) was added to the palladium nitrate solution and mixed. The ceria powder was impregnated with the Pd/Mg solution in the mix vessel.

LT-NA Composition Washcoat Slurry Preparation

The Pd/Mg impregnated ceria powder was mixed with deionized $H_2O$ (202 g). The pH of the slurry was 1.07, and the particle size was 15 μm. The slurry was milled until the resulting slurry had a $D_{90}$ particle size of about 11 microns and a pH value of about 1.2. Alumina binder was added and mixed well.

LT-NA Component Core Sample Preparation

Same as Example 1, using the 2% Pd/0.5% Mg/CeO₂ slurry.

LT-NA Component Core Sample Preparation for Testing

Same as Example 1, using the 2% Pd/0.5% Mg/CeO₂ slurry

Example 3

Inventive Catalytic Article (2% Pd/1% Sn/CeO₂)

1% Sn on Ceria Powder Preparation

Tin Acetate ((Sn(OAc)₄, 5 g) was diluted with acetic acid (25 g) and deionized water (50 g). The solution was mixed for 3 minutes to homogenize the liquid. It became a colloidal solution, beige in color. Ceria (251 g) was added into this solution. The slurry was mixed for 3 minutes. The resulting powder was of a greyish-brown color. The powder was dried for 4 hours at 120° C. and calcined for one hour at 500° C. to provide 1% Sn on CeO₂.

Palladium nitrate (20 grams) was diluted with deionized water (40 g). The 1% Sn on CeO₂ powder (200 grams) was added to the Pd solution and mixed for 3 minutes to homogenize the powder. The powder turned a gold color. The powder was dried for 4 hours at 120° C. and calcined for one hour at 500° C. to provide 2% Pd on 1% Sn/99% Ceria.

LT-NA Composition Washcoat Slurry Preparation

To deionized water (210 g) was added the 2% Pd on 1% Sn/99% ceria powder (177 g). The slurry was thoroughly mixed with a homogenizer; the pH of the slurry was 7.2. The pH of the slurry was adjusted to 5.3 with nitric acid (1.6 g). The slurry was milled to a particle size of about 7 microns and a pH value about 5.7. Alumina binder was added and mixed well.

LT-NA Component Core Sample Preparation

Two 1" diameter by 3" long ceramic substrate cores with a cell density of 400 cells per square inch were dipped into the Pd/Sn/CeO₂ washcoat slurry. The excess slurry was blown off using an air gun. The coated cores were dried at 200° C. with a hot air blower for 5-10 minutes, then calcined in an oven for one hour at 500° C.

LT-NA Component Core Sample Preparation for Testing

One of the core samples was subjected to an accelerated aging protocol to simulate the in-field use of a vehicle. The aging condition was set at 800° C. for 16 hours under an atmosphere of 10% water, 10% oxygen, and 80% nitrogen. The second core sample was tested without aging.

Example 4

Inventive Catalytic Article (2% Pd/1% Mn/CeO₂)

2% Pd on 1% Mn/99% CeO₂ Powder Preparation

Palladium nitrate (29 g) was diluted with deionized water (70 g). The palladium nitrate solution was added to 1% by weight Mn on ceria powder (302 g) in a mixer and mixed for 3 minutes to homogenize the powder. The powder was dried for 4 hours at 120° C. and calcined for one hour at 500° C.

LT-NA Composition Washcoat Slurry Preparation

To deionized water (225 g) was added 2% Pd/1% Mn/CeO₂ powder (168 g) and mixed well with a homogenizer; the pH of the slurry was 4.7. The slurry was ball milled for 40 minutes to a particle size of about 9 microns. The pH value of the resulting slurry was 4.9. Alumina binder was added and mixed well.

LT-NA Component Core Sample Preparation

Two 1" diameter and 3" long ceramic substrate cores with a cell density of 400 cells per square inch were dipped into the 2% Pd/1% Mn/CeO₂ slurry. The excess slurry was blown off using an air gun. The coated cores were dried at 200° C. with a hot air blower for 5-10 minutes, followed by calcination in an oven for one hour at 500° C.

LT-NA Component Core Sample Preparation for Testing

One of the cores was subjected to an accelerated aging protocol to simulate the in-field use of a vehicle. The aging condition was set at 800° C. for 16 hours, under an atmosphere of 10% water, 10% oxygen, 80% nitrogen. The second core was tested as is.

Example 5

Inventive Catalytic Article (2% Pd/5% Mn/CeO$_2$, 400 cpsi)

All processes were performed as in Example 4, but substituting 2% Pd/5% Mn/CeO$_2$ for the 2% Pd/1% Mn/CeO$_2$.

Example 6

Inventive Catalytic Article (2% Pd/5% Mn/CeO$_2$, 600 cpsi)

All processes were performed as in Example 5, except for the substrate used (cell density of 600 cpsi rather than 400 cpsi).

Example 7

Reactor Testing of the Core Samples (Steady State Conditions)

Both the fresh and the aged samples were evaluated in a lab reactor under the pre-set conditions listed below:

| Condition | Adsorption | Desorption |
|---|---|---|
| Elapsed Time, s | 1200 | 380 |
| Temperature, C | 120 | 120-500 |
| Ramp rate, C/min | N/A | 60 |
| SV, 1/h | 35000 | 35000 |
| Total flow, ml/min | 19306 | 19306 |
| CO, ppm | 500 | 0 |
| H$_2$, ppm | 334 | 0 |
| C$_3$H$_6$, ppm | 375 | 0 |
| C$_3$H$_8$, ppm | 125 | 0 |
| Liq HC, ppm C$_1$ | 0 | 0 |
| NO, ppm | 175 | 0 |
| NO$_2$, ppm | 175 | 0 |
| O$_2$, % | 10 | 10 |
| CO$_2$, % | 10 | 0 |
| H$_2$O, % | 10 | 10 |

Example 8

Inventive Catalytic Article (Pd/5% Mn/CeO$_2$, 400 cpsi Versus 600 cpsi, Adsorption)

Figure 5:
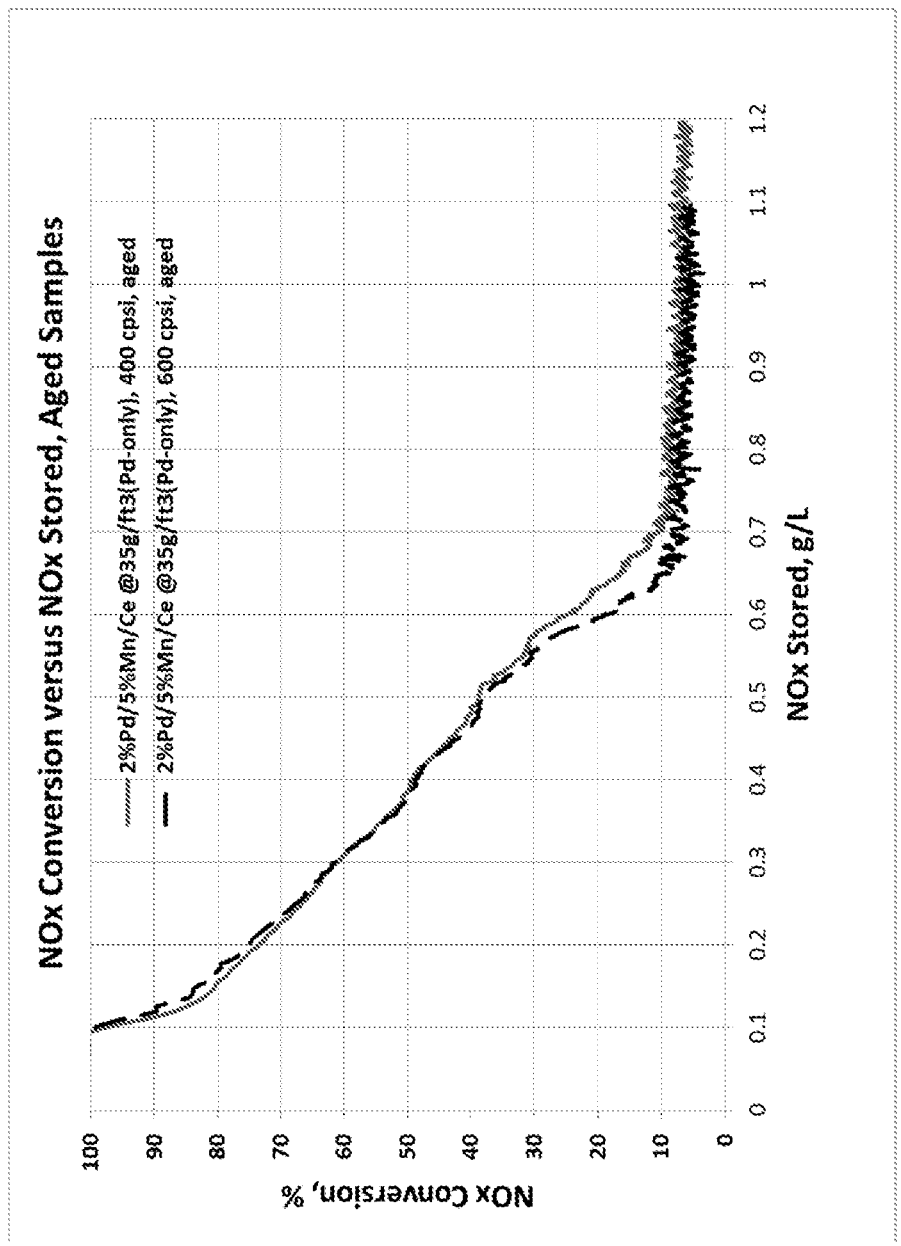
FIG. 5 is a graph of $NO_x$ adsorption (%) versus NOx stored (g/L), between 400 and 600 cpsi substrates coated with an embodiment of the LT-NA composition as disclosed herein.

While it is common to observe a better activity for a catalyst coated on a 600 cells-per-square-inch (cpsi) honeycomb as compared to a 400 cells-per-square-inch (cpsi) honeycomb, the objective of this Example was to verify whether the same advantages can be seen in NO$_x$ adsorption, using the protocol of Example 7. The results, shown in FIG. 5, indicated that after aging, there was no difference in NO$_x$ adsorption between the 600 cpsi and the 400 cpsi substrates.

Example 9

Inventive Catalytic Article (Pd/5% Mn/CeO$_2$, 400 cpsi Versus 600 cpsi, Desorption)

Figure 6:
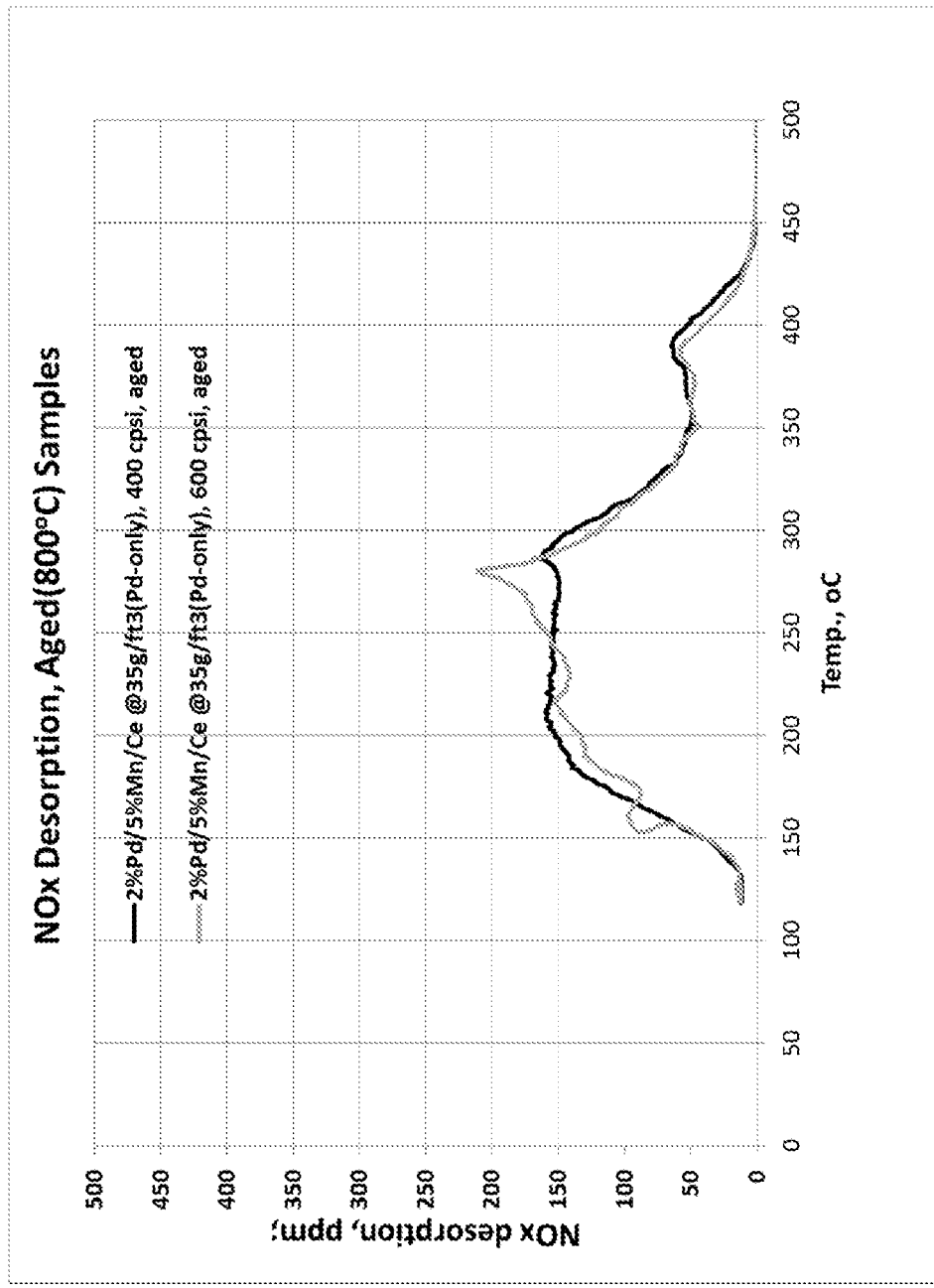
FIG. 6 is a graph of $NO_x$ desorption (ppm) versus temperature (° C.), between 400 and 600 cpsi substrates coated with an embodiment of the LT-NA composition as disclosed herein.

Comparable results were observed during the desorption testing, using the protocol of Example 7 (FIG. 6).

Example 10

Reactor Testing of the Various Pd/CeO$_2$ Core Samples (Pd Loading Effect; Steady-State NO$_x$ Adsorption, 400 cpsi)

Figure 7:
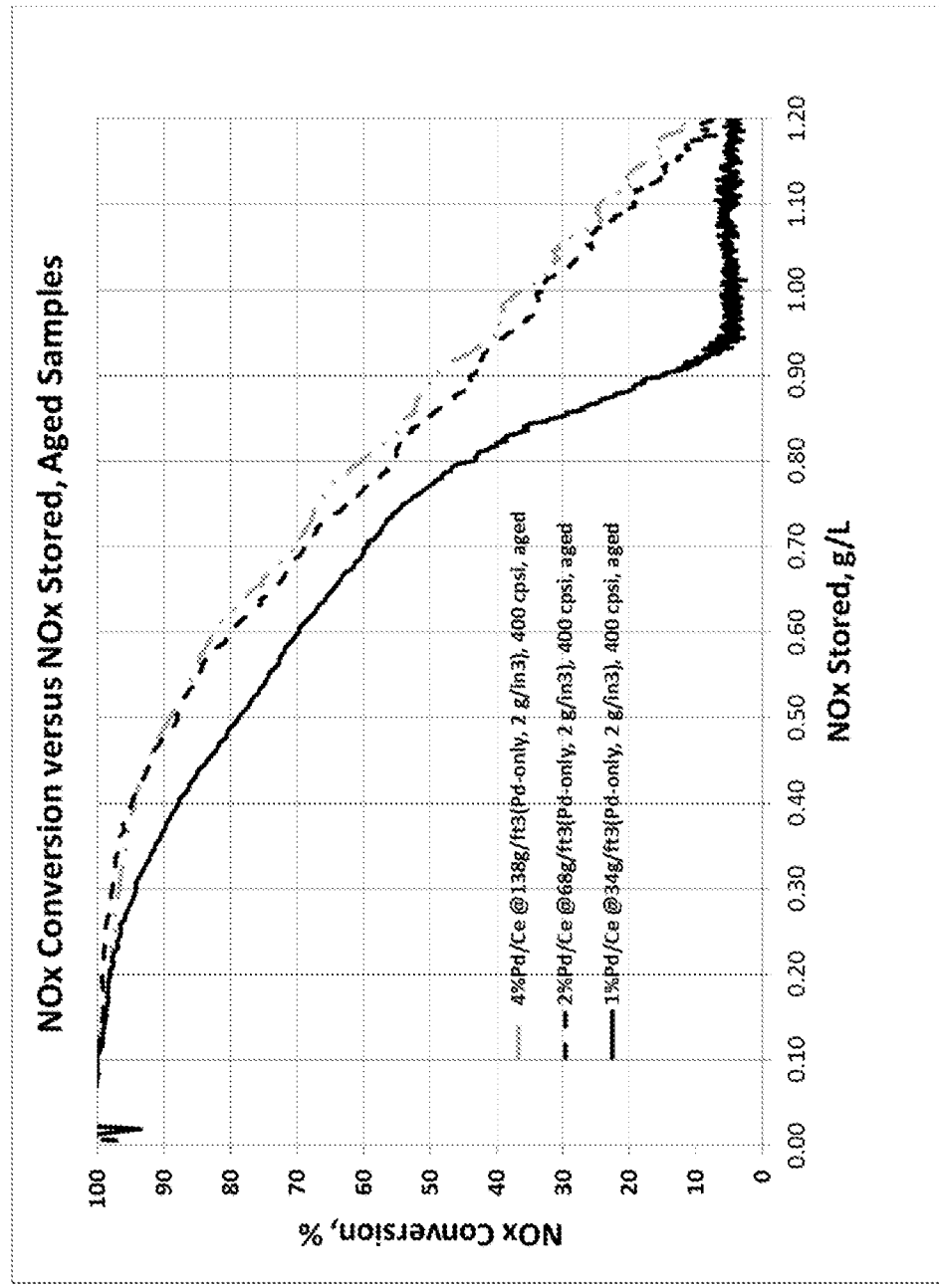
FIG. 7 is a graph of $NO_x$ adsorption (%) versus $NO_x$ stored (g/L), for embodiments of an LT-NA component according to the present disclosure containing various amounts of Pd loading (400 cpsi, 2 g/in$^3$ washcoat loading)

This example studied the effect of Pd loading on ceria, all based on the same amount of washcoat loading (WCL), i.e., ceria at 2 g/in$^3$. The amounts of Pd loading, expressed as g/ft$^3$, were 34, 68, and 138 g/ft$^3$. Results, shown in FIG. 7, indicated that the higher the Pd loading, the better the total NO$_x$ adsorption. However, a plateau was reached when the Pd concentration was above 2%.

Example 11

Reactor Testing of the Various Pd/CeO$_2$ Core Samples (Pd Loading Effect; Desorption, 400 cpsi)

Figure 8:
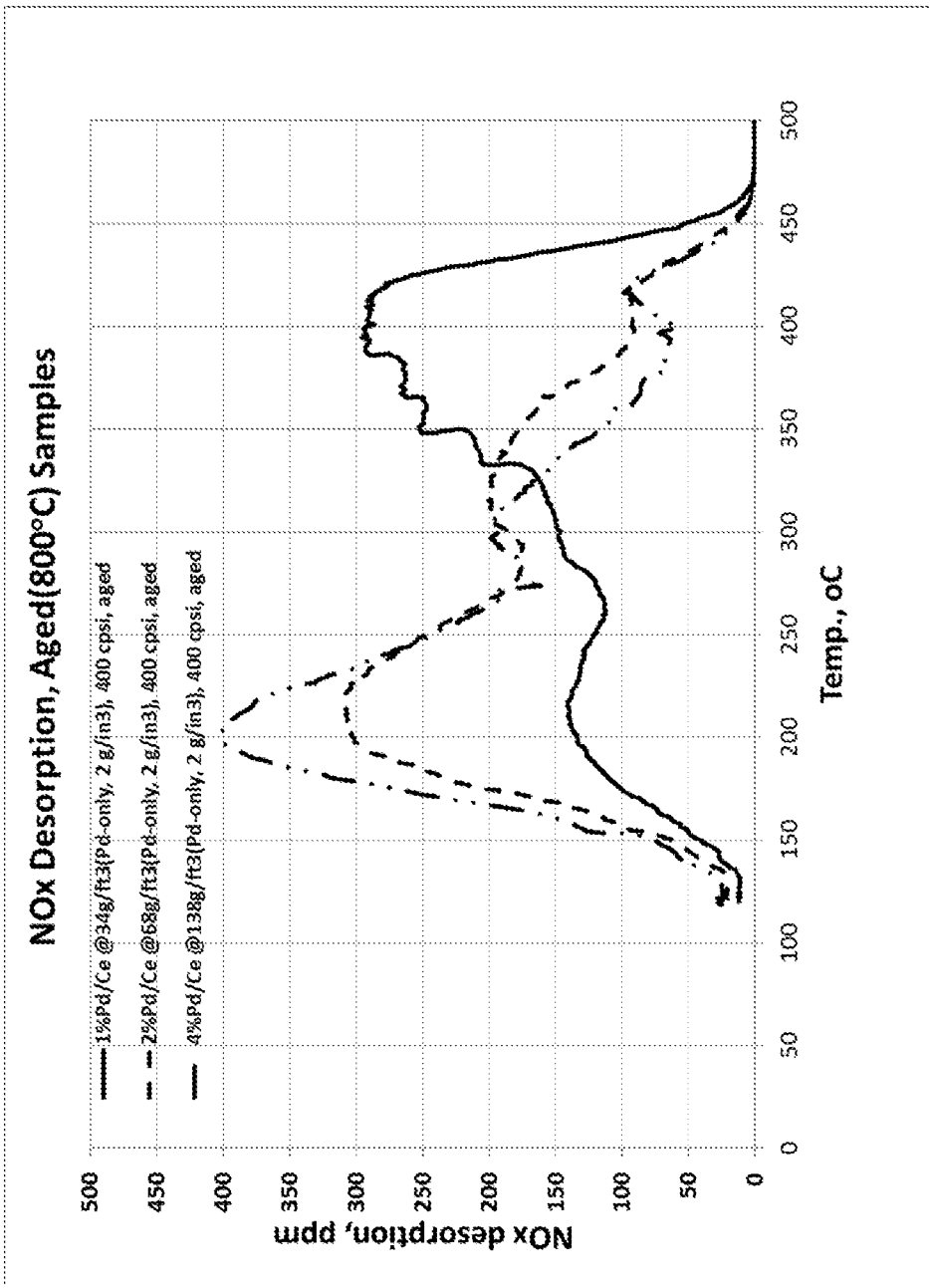
FIG. 8 is a graph of $NO_x$ desorption (ppm) versus temperature (° C.), for embodiments of an LT-NA component according to the present disclosure containing various amounts of Pd loading (400 cpsi, 2 g/in$^3$ WCL)

During the desorption phase, the higher the Pd concentration, the more NO$_x$ was desorbed at lower temperature, as shown in FIG. 8.

Example 12

Reactor Testing of the Various Pd/CeO$_2$ Core Samples (Pd Loading Effect; Desorption, NO-Only)

Figure 9:
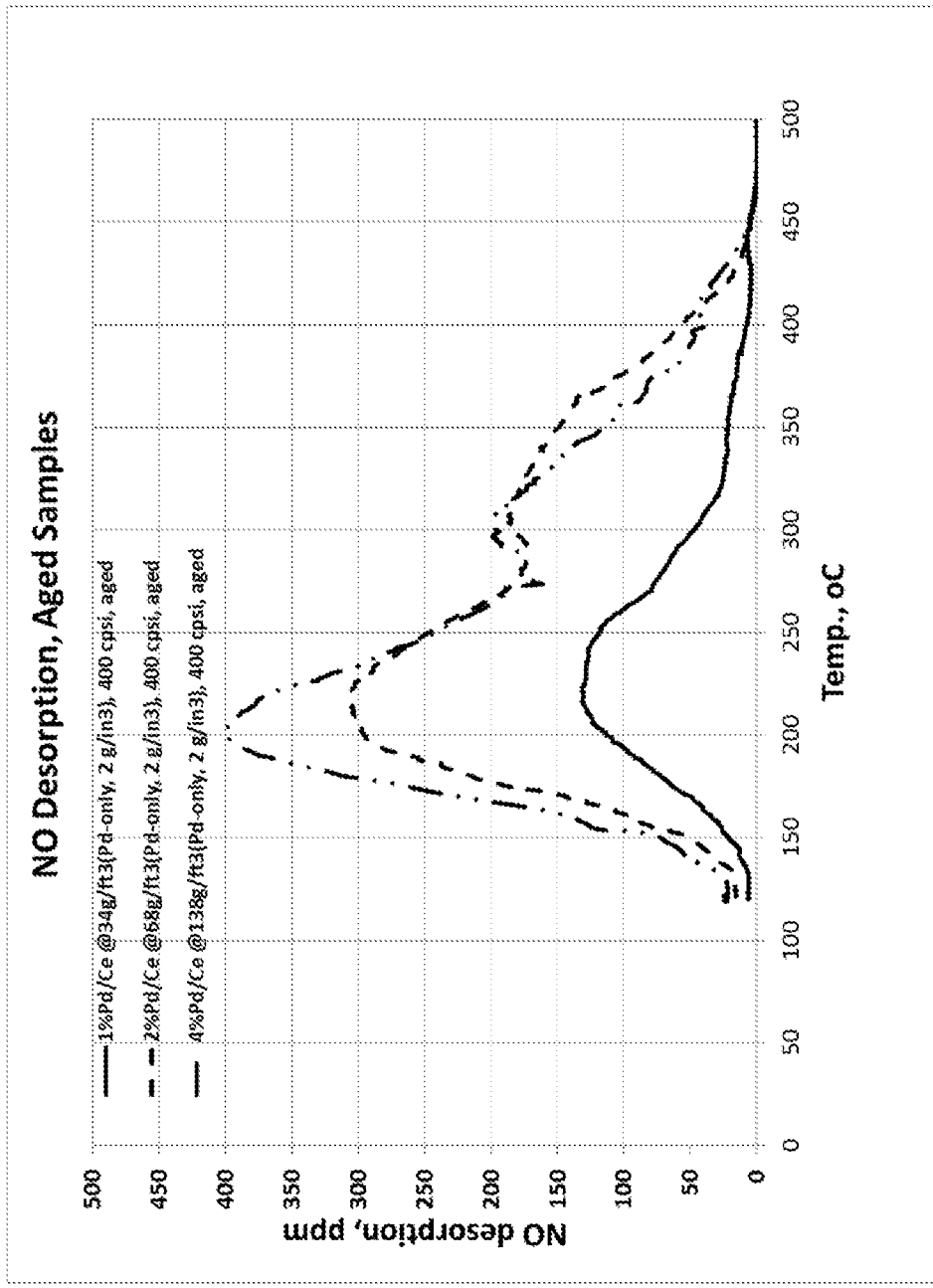
FIG. 9 is a graph of NO desorption (ppm) versus temperature (° C.), for embodiments of an LT-NA component according to the present disclosure containing various amounts of Pd loading (Pd loading effect; desorption, NO-only)
Figure 10:
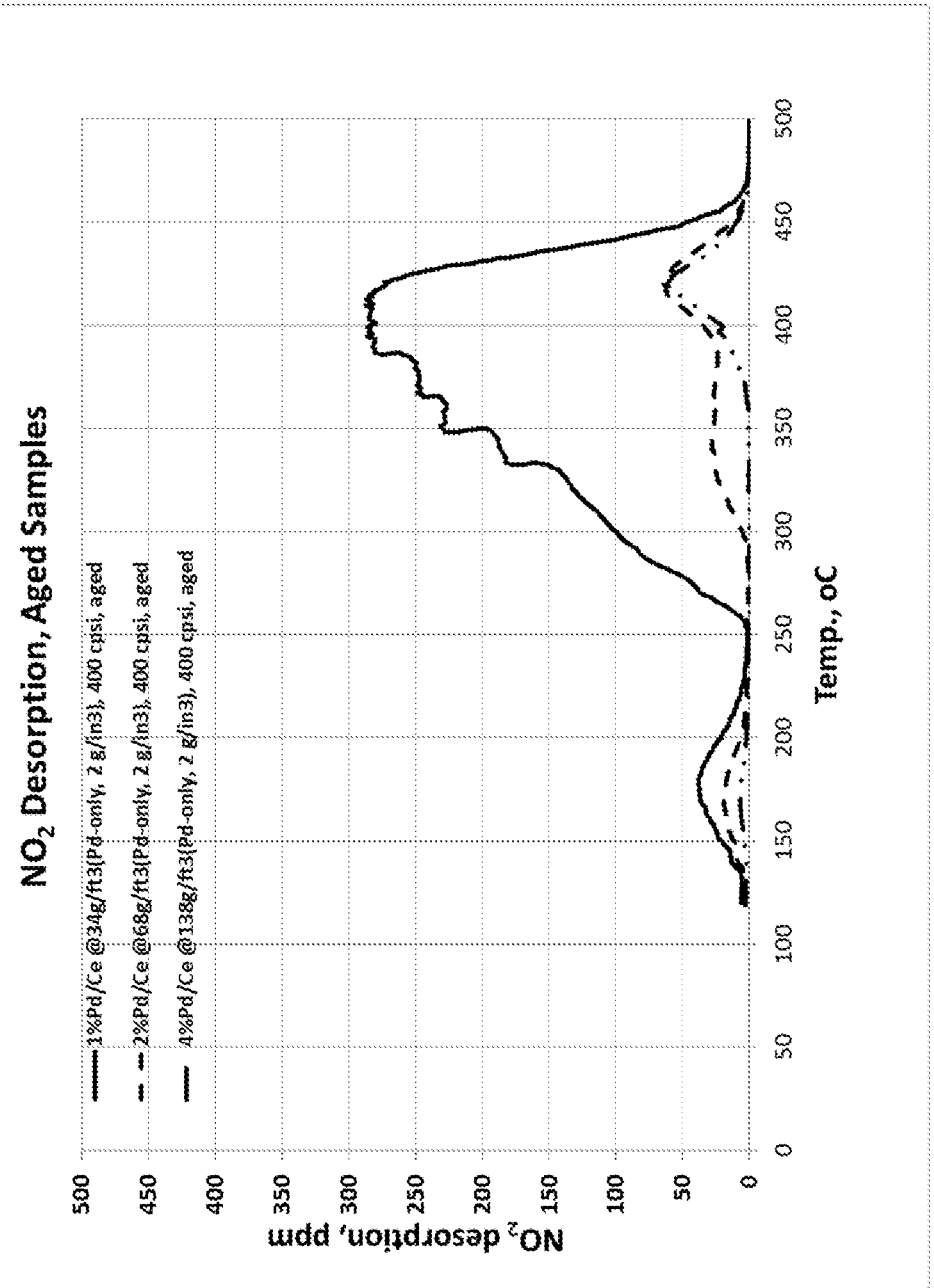
FIG. 10 is a graph of $NO_2$ desorption (ppm) versus temperature (° C.), for embodiments of an LT-NA component according to the present disclosure containing various amounts of Pd loading (Pd loading effect; 400 cpsi, $NO_2$-only)

To identify whether this desorption temperature shift was related to the species (NO or NO$_2$) that adsorbed, a desorption plot for NO only was prepared, presented as FIG. 9. The results demonstrated that the more Pd on the ceria surface, the more NO was adsorbed, and NO was released at a lower temperature than NO$_2$ This observation was further verified through a NO$_2$ desorption plot, presented as FIG. 10.

Example 13

Reactor Testing of the Various Pd/CeO$_2$ Core Samples (Pd Loading Effect; Desorption, NO$_2$-Only)

The results demonstrated that NO$_x$ release temperatures and species were controlled by the Pd concentration. At a Pd concentration greater than 2%, NO$_2$ adsorption/release on the ceria support was minimized and NO adsorption enhanced at 120° C. by converting some of the NO$_2$ to NO.

Example 14

Reactor Testing of the Fresh Pd/CeO$_2$ Core Samples (Pd Loading Effect; Desorption, NO$_2$-Only)

Figure 11:
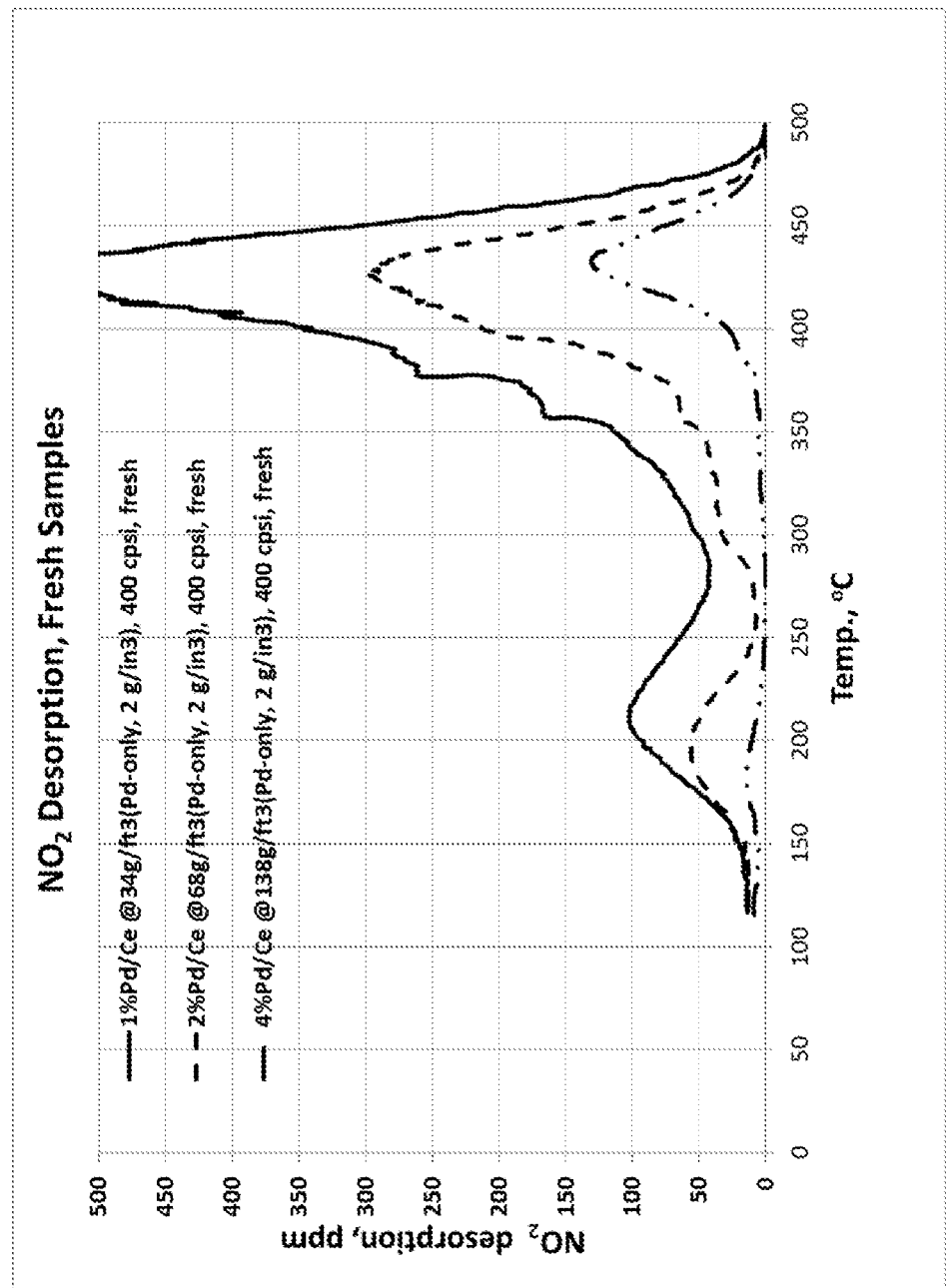
FIG. 11 is a graph of $NO_2$ desorption (ppm) versus temperature (° C.), for embodiments of an LT-NA component according to the present disclosure containing various amounts of Pd loading (fresh samples; desorption, $NO_2$-only)
Figure 12:
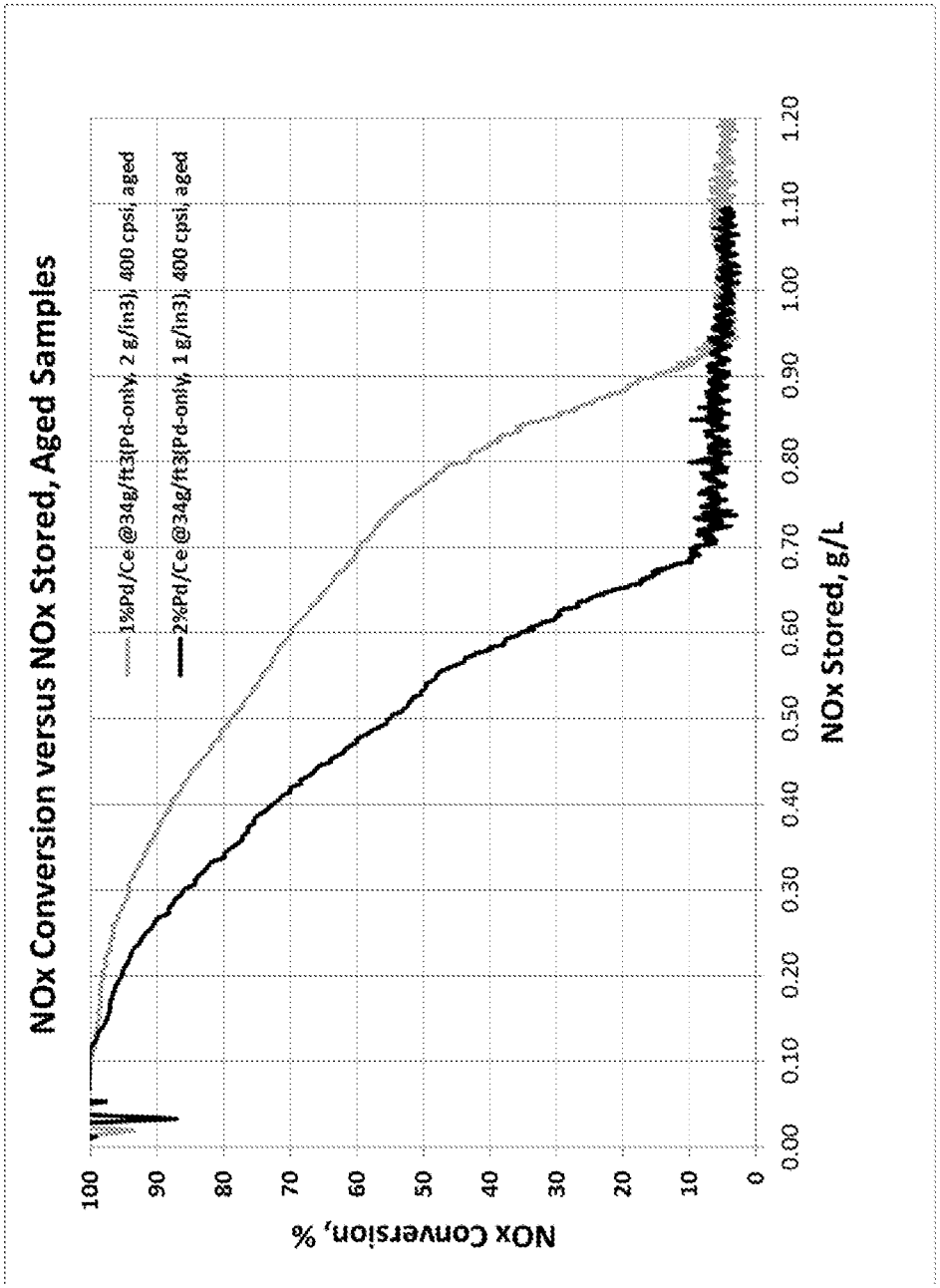
FIG. 12 is a graph of $NO_x$ adsorption (%) versus $NO_x$ stored (g/L), for embodiments of an LT-NA component according to the present disclosure containing various amounts of Ce loading (400 cpsi, same Pd loading at 34 g/ft$^3$)

Again, the higher the Pd loading, the less of NO$_2$ desorption, even for the fresh samples (FIG. 11).

Example 15

Reactor Testing of the Various Core Samples with Different Amounts of Ceria Loading (Adsorption)

To further demonstrate the ceria impact on the NO$_x$ adsorption/release profile, two LT-NA component samples were tested under the same protocol (Example 7). One sample had 1% Pd on ceria, with a ceria washcoat loading of 2 g/in$^3$, so that the total Pd loading was 34 g/ft$^3$. The other one had a Pd concentration on ceria at 2%, but with a ceria loading of 1 g/in$^3$, so that the total Pd loading was the same (34 g/ft$^3$). Results, shown in FIG. 13, indicated that the 2 g/in$^3$ ceria sample had a higher NO$_x$ adsorption capacity than the 1 g/in$^3$ ceria sample, despite the same Pd loading.

Example 16

Reactor Testing of the Various Pd/CeO$_2$ Core Samples (Ceria Loading Effect; Desorption, 400 cpsi)

Figure 13:
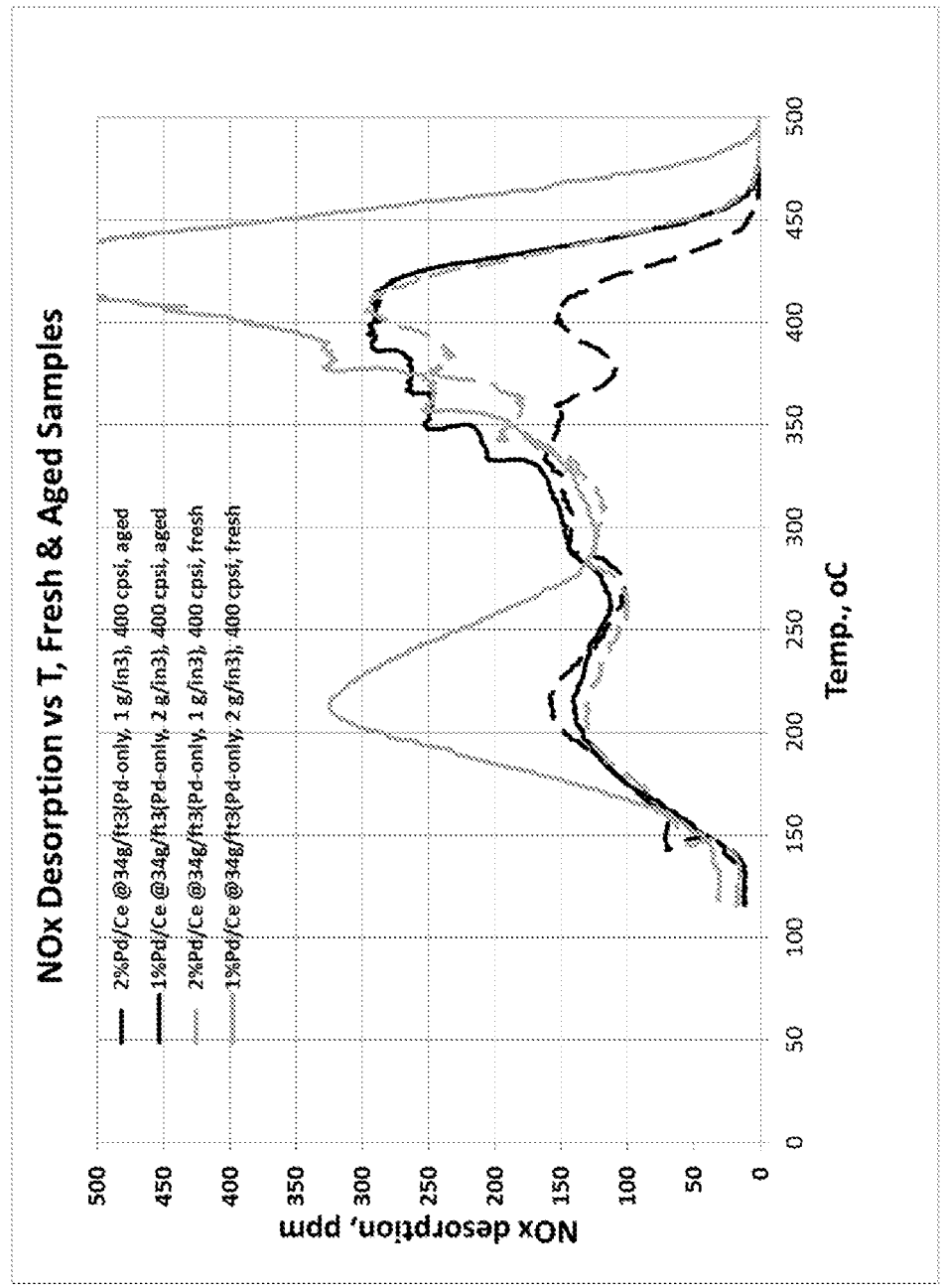
FIG. 13 is a graph of $NO_x$ adsorption (%) versus NOx stored (g/L), for embodiments of an LT-NA component according to the present disclosure containing various amounts of Ce loading (400 cpsi, same Pd loading at 34 g/ft$^3$)

For desorption, both fresh and aged samples were evaluated. Whether fresh or aged, the sample with a higher ceria loading (2 g/in$^3$) demonstrated higher NOx desorption peaks, and a higher desorption temperature for the second peak (FIG. 13).

Figure 14:
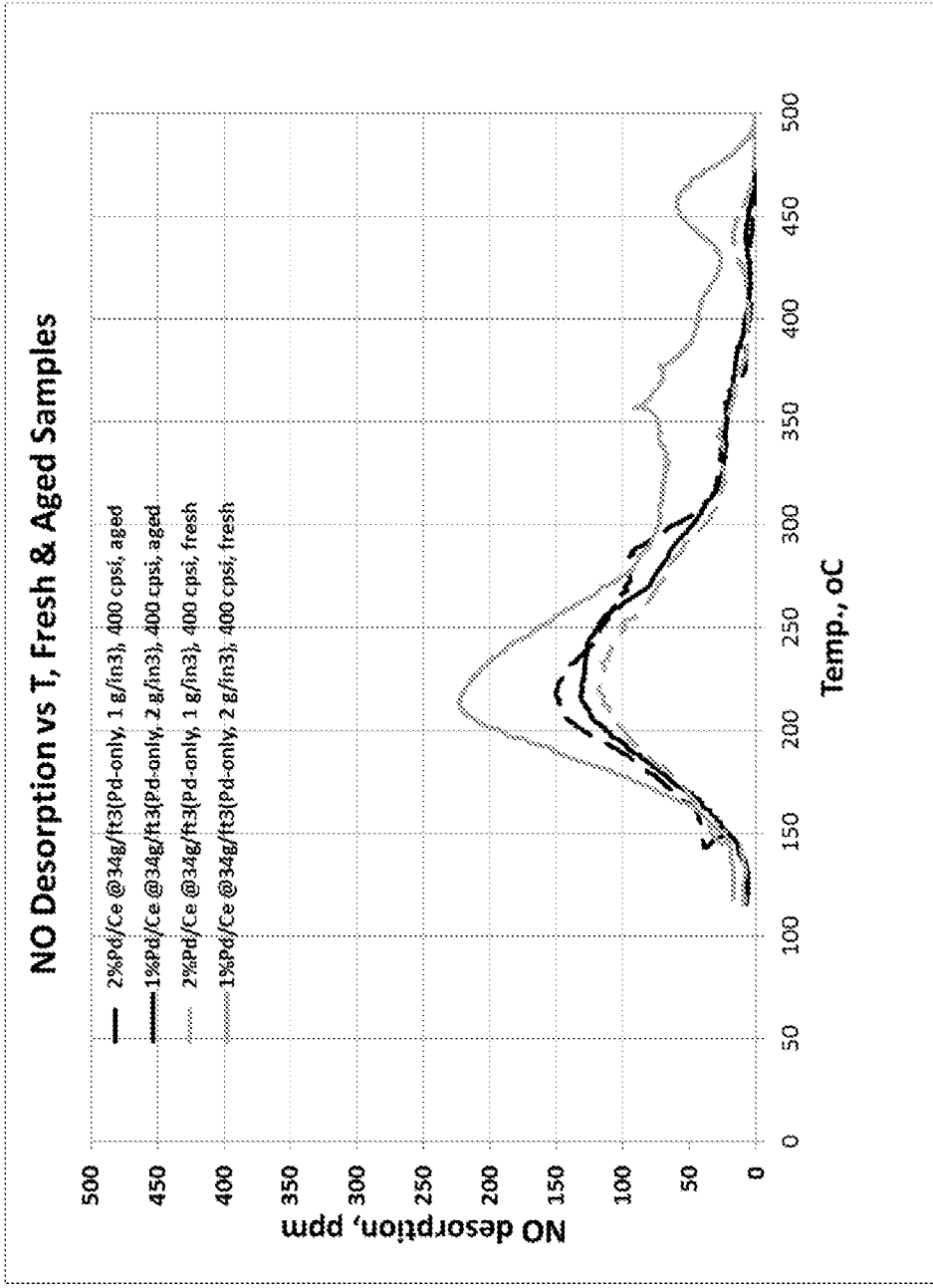
FIG. 14 is a graph of NO desorption (ppm) versus temperature (° C.), for embodiments of an LT-NA component according to the present disclosure containing various amounts of Ce loading (Ce loading effect; desorption, NO-only)
Figure 15:
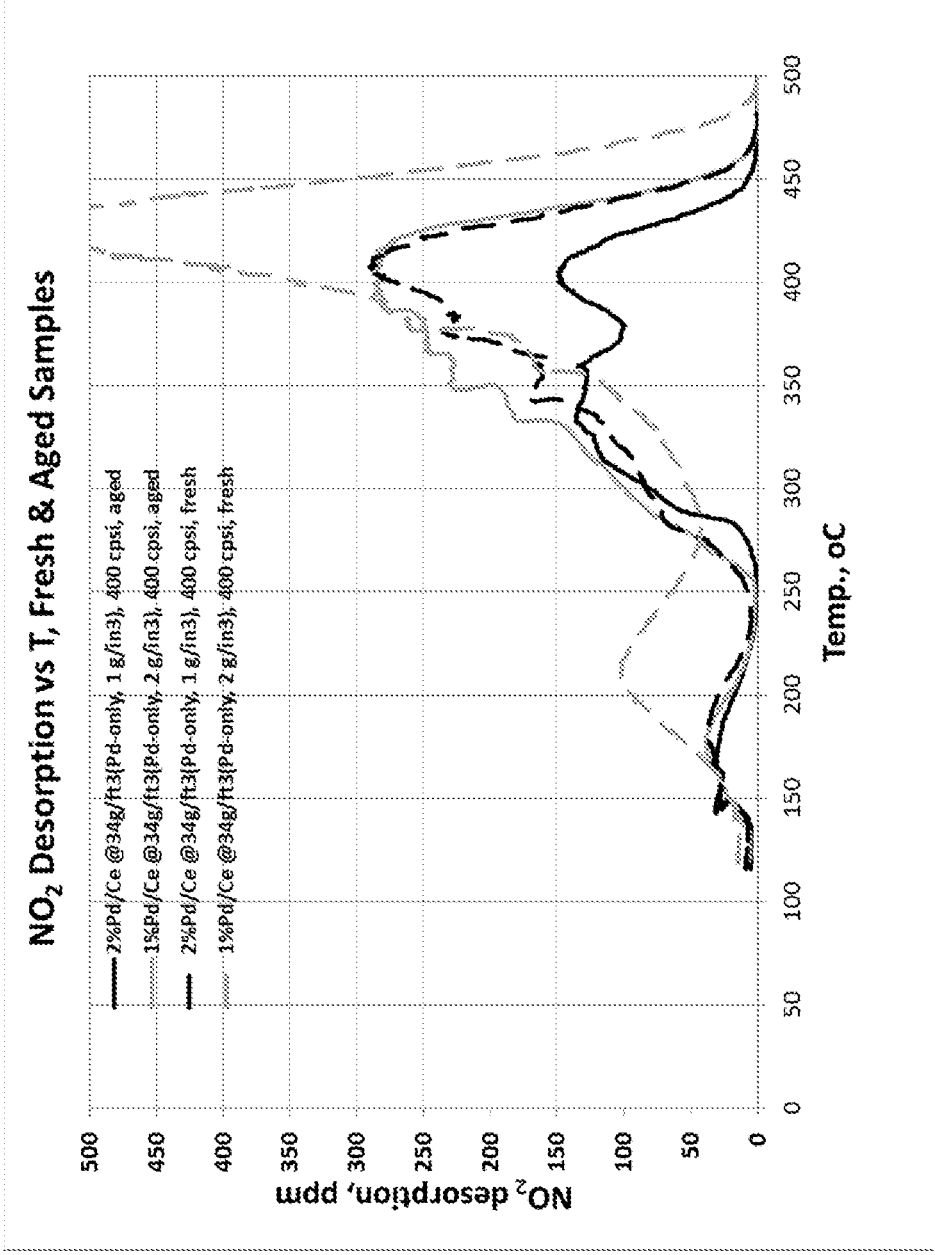
FIG. 15 is a graph of $NO_2$ desorption (ppm) versus temperature (° C.), for embodiments of an LT-NA component according to the present disclosure containing various amounts of Ce loading (Ce loading effect; desorption, $NO_2$-only)

To identify whether the second peak (higher desorption temperature) was NO or NO$_2$, both NO (FIG. 14) and NO$_2$ (FIG. 15) desorption plots were prepared. The results demonstrated that all samples had a similar NO adsorption capacity, indicating that Pd was responsible for NO adsorption, and this kind of adsorption was weak, as it released the adsorbed NO at a lower temperature. In contrast, the strength of NO$_2$ adsorption was much stronger than NO adsorption; the NO$_2$ desorption, consequently, occurred at a higher temperature (FIG. 15). Also, the NO$_2$ adsorption took place mainly on the ceria.

Example 17

Reactor Testing of the Various Ceria Core Samples with Different Dopants (Adsorption, 400 cpsi)

Figure 16:
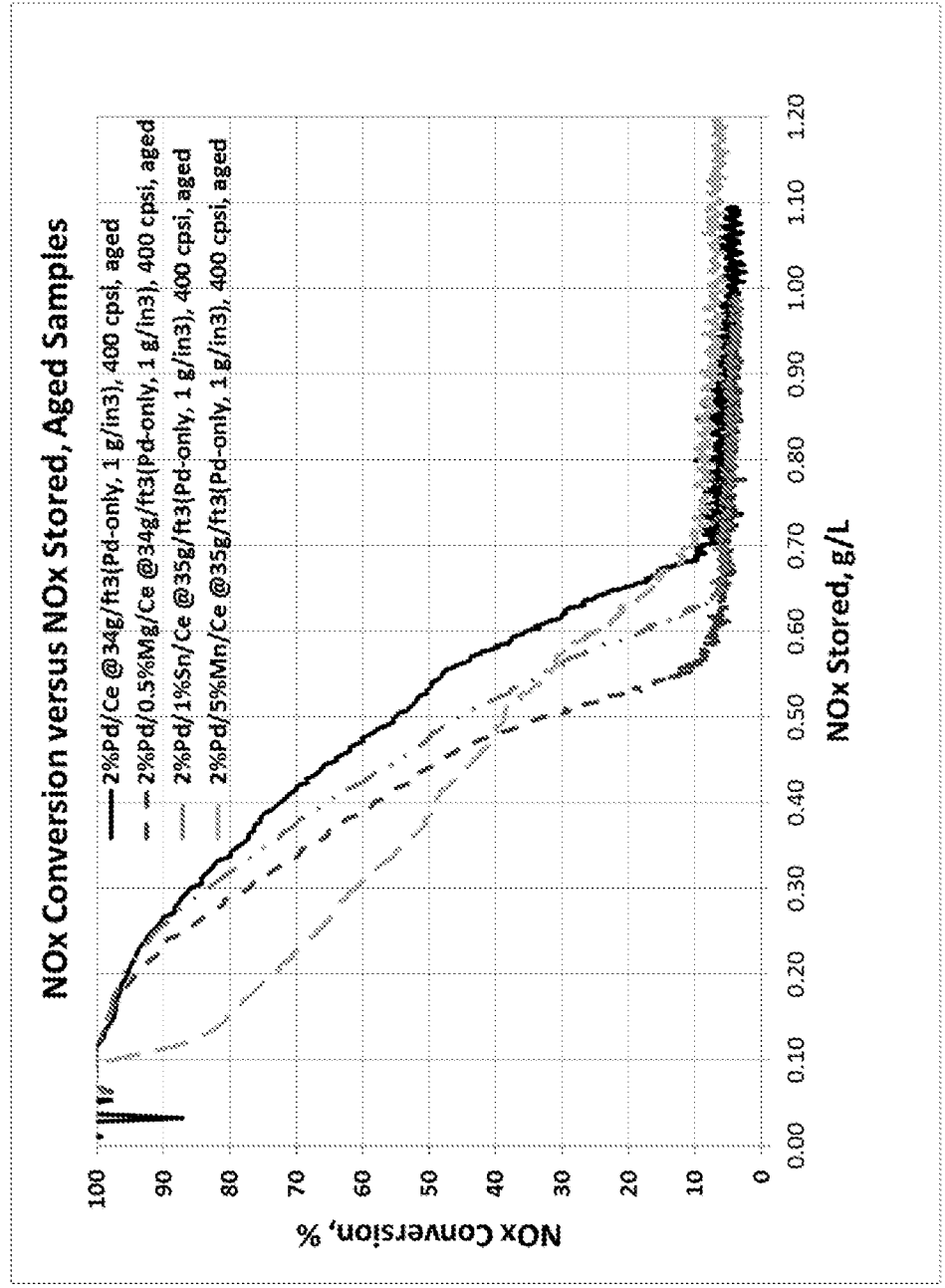
FIG. 16 is a graph of $NO_x$ adsorption (%) versus NOx stored (g/L), for embodiments of an LT-NA component according to the present disclosure containing various dopants (adsorption; 400 cpsi, 1 g/in$^3$ WCL)

Having demonstrated Pd diminished the release of NO$_2$ at high temperatures, but enhanced NO desorption at low temperatures, the possibility of using other dopants to adjust the NO and NO$_2$ release to fit OEM requirements was explored. The effect of doping ceria with Mg, Sn, and Mn was evaluated. The NO$_x$ conversion versus NO$_x$ storage capacity plot (FIG. 16) indicated that Sn had the least impact on NO$_x$ storage capacity, while Mn had the greatest impact on the storage capacity, particularly during the initial adsorption phase.

Example 18

Reactor Testing of the Various Doped-Ceria Core Samples with Different Dopants (Desorption, 400 cpsi)

Figure 17:
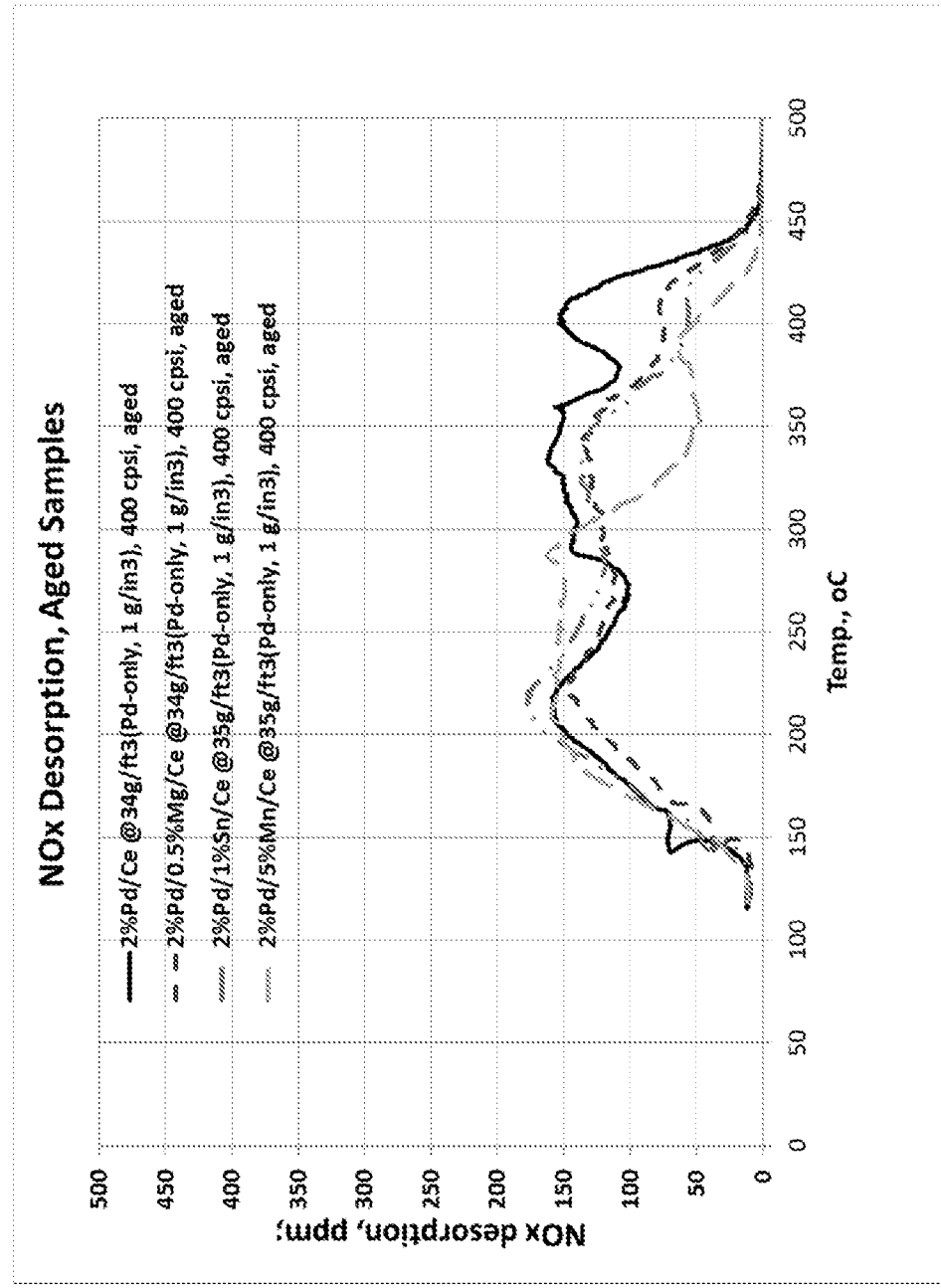
FIG. 17 is a graph of reactor testing of various doped Ce core samples for embodiments of an LT-NA component according to the present disclosure with different dopants (desorption, 400 cpsi)
Figure 18:
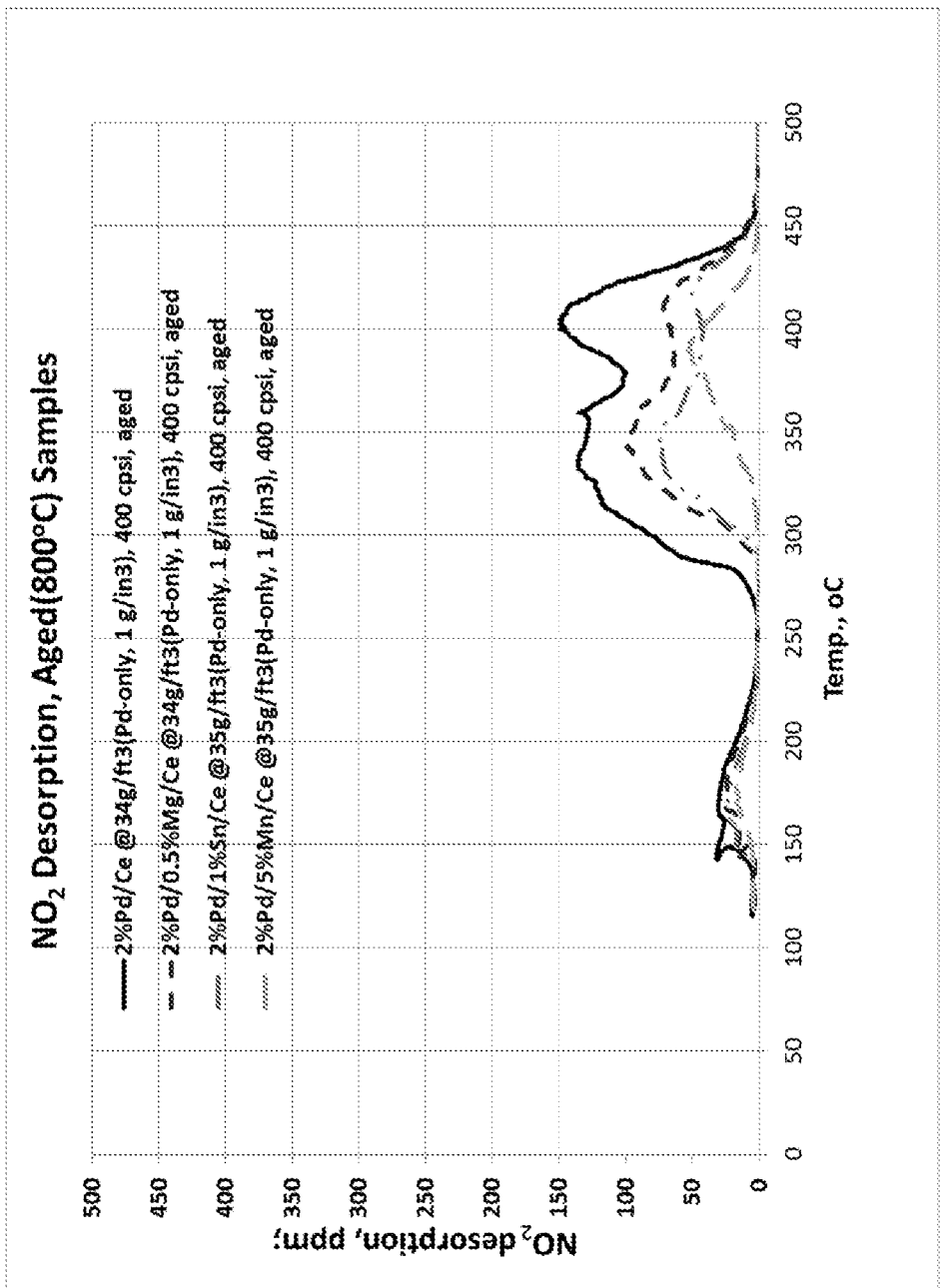
FIG. 18 is a graph of reactor testing of the various doped Ce core samples for embodiments of an LT-NA component according to the present disclosure with different dopants (desorption, 400 cpsi)

Regarding NO$_x$ desorption, the Mn addition to ceria diminished the high temperature NO$_x$ release peaks, as shown in FIG. 17. The diminished NO$_x$ releasing portion was shown to be NO$_2$ (FIG. 18).

Example 19

Reactor Testing of the Samples with Various Mn-Doped Ceria Core Samples (Adsorption, 600 cpsi)

Figure 19:
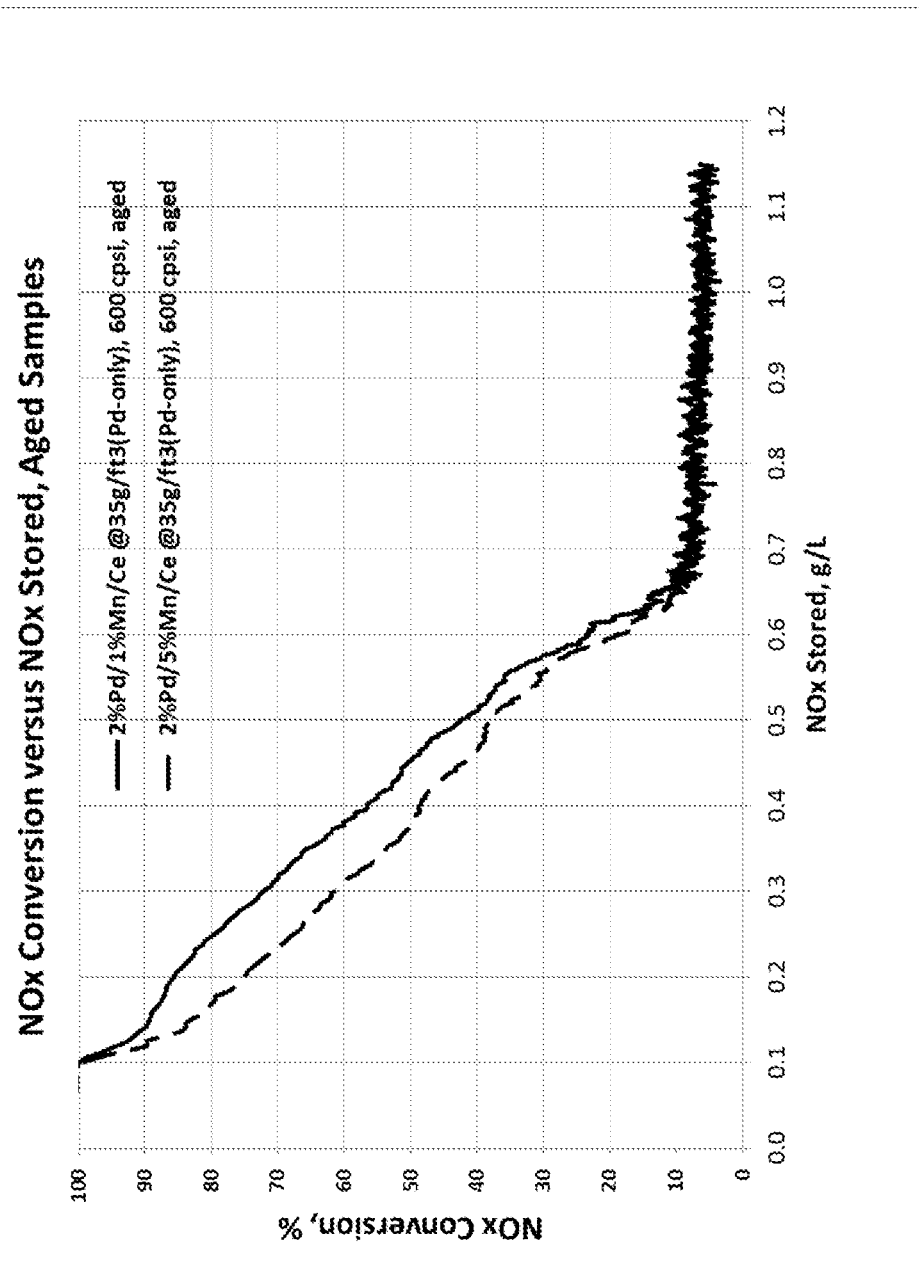
FIG. 19 is a graph of $NO_x$ adsorption (%) versus $NO_x$ stored (g/L), for embodiments of an LT-NA component according to the present disclosure containing various amounts of Mn-dopant (adsorption; 600 cpsi, 1 g/in$^3$ WCL)

To evaluate the impact of dopant concentration, two Mn-doped ceria samples were tested, (FIG. 19). It was observed that the higher the Mn loading, the faster the NO$_x$ conversion curve diminished.

Example 20

Reactor Testing of the Samples with Different Mn-Dopant Concentrations (Desorption, 600 cpsi)

Figure 20:
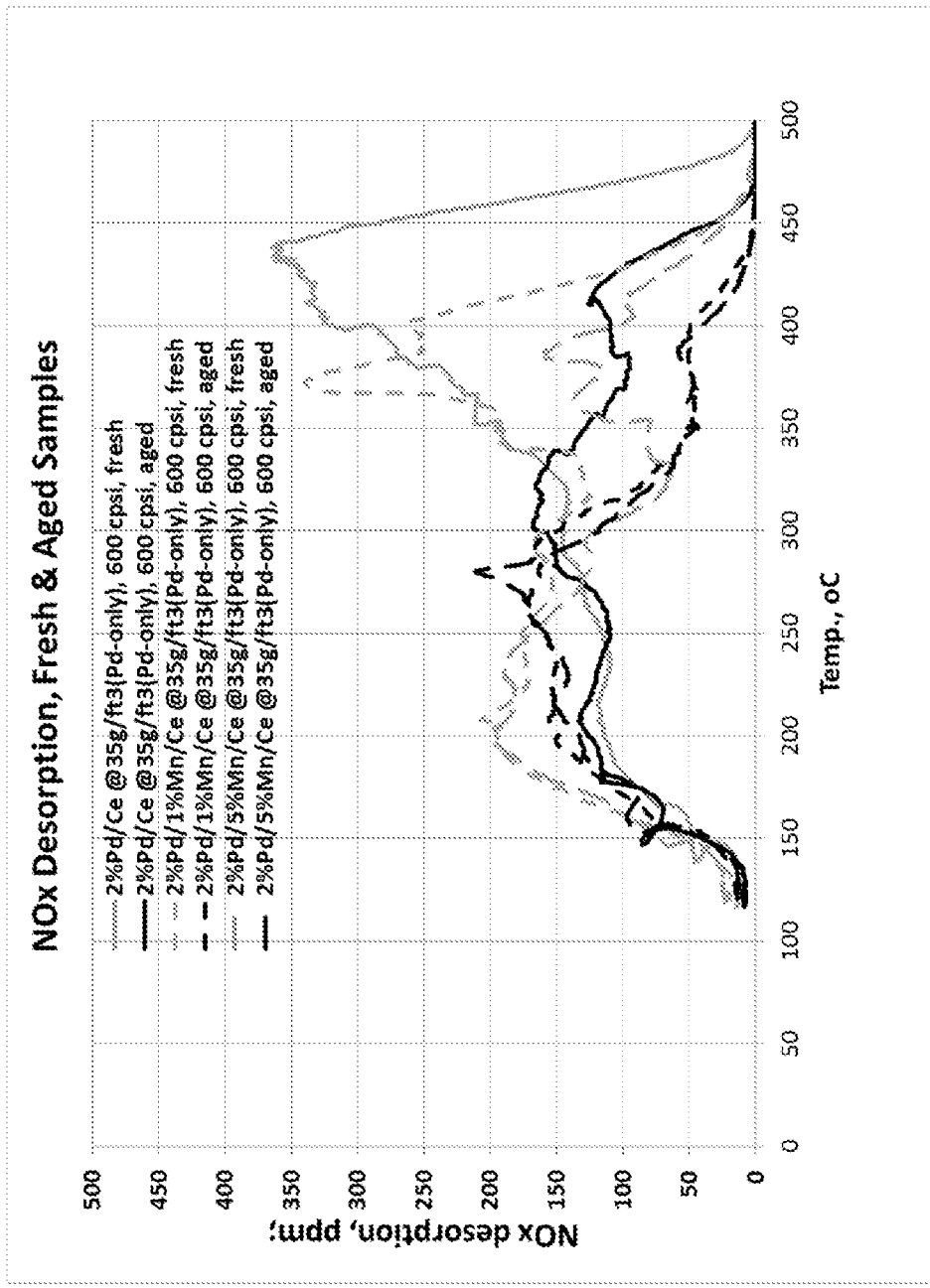
FIG. 20 is a graph of reactor testing of various embodiments of an LT-NA component according to the present disclosure containing various amounts of Mn-dopant (desorption, 600 cpsi)

Regarding NO$_x$ desorption, for the fresh samples, the higher the Mn loading, the more diminished the high temperature NO$_x$ release peak. After aging, even a small amount of Mn (1%) reduced almost all the sites for NO$_2$ adsorption, as shown in FIG. 20.

Example 21

Reactor Testing of the Samples with Different Dopant Concentrations (Desorption, 600 cpsi, NO$_2$-only)

Figure 21:
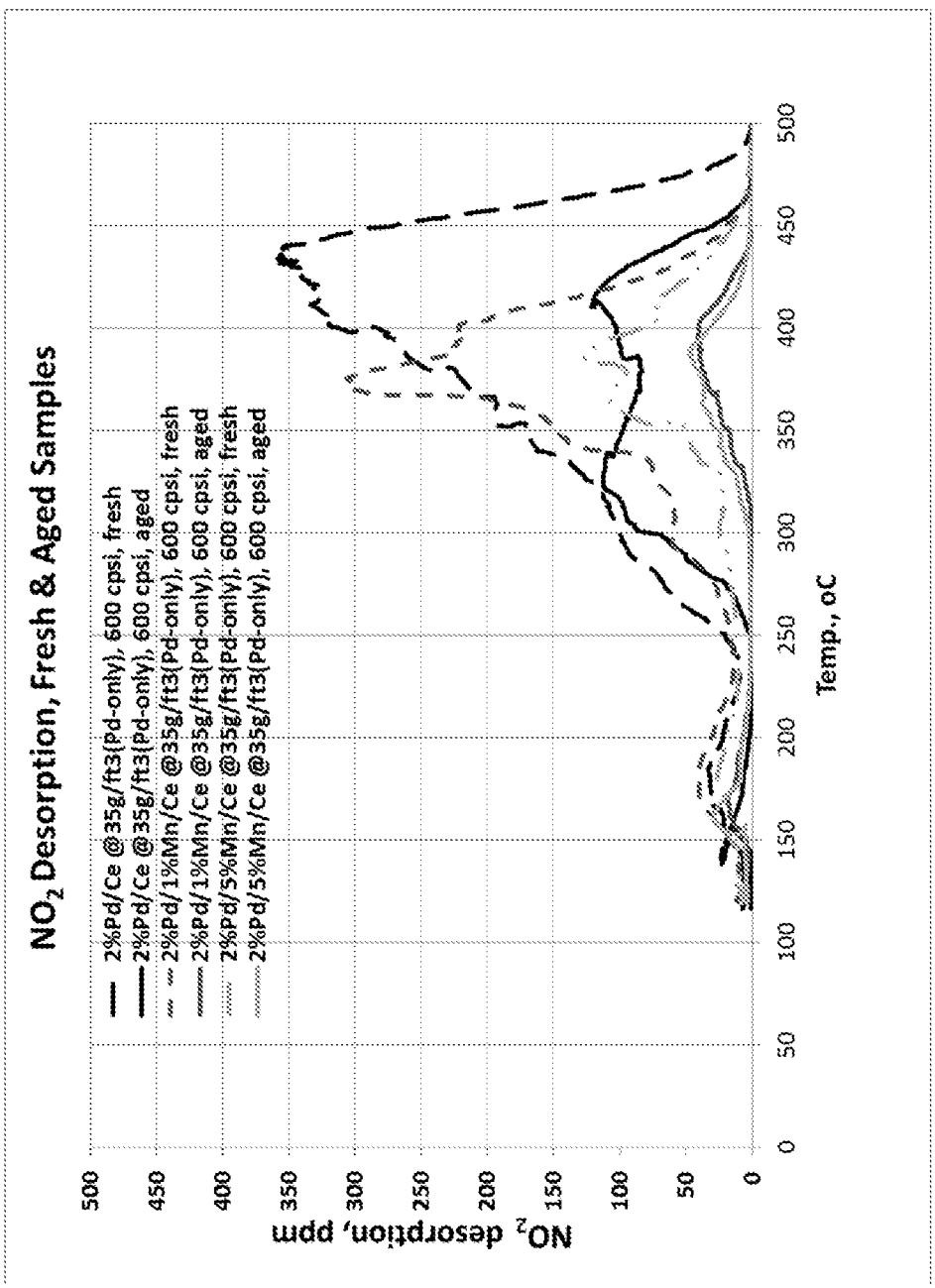
FIG. 21 is a graph of reactor testing of various embodiments of an LT-NA component according to the present disclosure having Mn-doped Ce core samples (desorption, 600 cpsi, $NO_2$-only).

As shown in FIG. 21, the higher the Mn loading, the more diminished the high temperature NO$_2$ release peak.

What is claimed is:

1. A method for treating a gaseous exhaust stream comprising a mixture of nitrogen oxides (NOx) flowing from the exhaust manifold of a diesel engine or a lean-burn gasoline engine during a period following a cold-start of the engine, the method comprising contacting the gaseous exhaust stream with a low-temperature NOx adsorber (LT-NA) component comprising a LT-NA composition, the LT-NA component disposed downstream of and in fluid communication with the exhaust manifold, the LT-NA composition comprising:
   a rare-earth metal component;
   a platinum group metal (PGM) component; and
   a dopant, wherein the dopant is an oxide of boron, silicon, tin, phosphorus, antimony, or bismuth;
   wherein the PGM and the dopant are disposed on or impregnated in the rare earthrare-earth metal component; and
   wherein the LT-NA component is effective for storing the NOx at temperatures below 200° C., and releases the stored NOx at a predetermined temperature.

2. The method of claim 1, wherein the rare-earth metal component comprises ceria.

3. The method of claim 1, wherein the PGM component comprises palladium, platinum, rhodium, rhenium, ruthenium, iridium, or a combination thereof.

4. The method of claim 1, wherein the predetermined temperature for releasing the stored NOx ranges from 200° C. to 450° C.

5. The method of claim 1, wherein the LT-NA component comprises:
   a substrate; and
   one or more washcoats comprising the LT-NA composition disposed on at least a portion of the substrate.

6. The method of claim 5, wherein the one or more washcoats are coated on the substrate in a layered or zoned configuration.

7. The method of claim 5, wherein the substrate is a wall-flow or flow-through substrate.

8. The method of claim 1, wherein treating the exhaust gas stream further comprises selectively removing at least a portion of NOx in the gaseous exhaust stream.

9. The method of claim 1, wherein treating the exhaust gas stream further comprises adjusting the distribution of nitric oxide (NO) and nitrogen dioxide (NO$_2$) in the gaseous exhaust stream.

10. The method of claim 1, wherein the LT-NA component is effective for storing one or more of NO and NO$_2$ at a temperature below 200°° C., and releasing at least one of NO and $NO_2$ at a predetermined temperature.

11. The method of claim 10, wherein the predetermined temperature for releasing NO, $NO_2$, or both ranges from 200° C. to 450° C.

12. The method of claim 1, wherein contacting the gaseous exhaust stream with a LT-NA component comprises:
   continually passing the exhaust gas stream into contact with the LT-NA component, the exhaust gas stream being at an initial temperature at or below 150°° C. and progressively warming during further engine operation;
   adsorbing and storing the NOx from the exhaust gas stream until the exhaust gas stream reaches a predetermined temperature, wherein the NOx is released into the exhaust gas stream exiting the LT-NA component; and
   continually passing the exhaust gas stream exiting the LT-NA component into contact with at least one downstream catalytic material for further oxidation of nitric oxide or for reduction of nitric oxide and nitrogen dioxide as the exhaust gas stream increases in temperature and heats each such downstream catalytic material to an operating temperature that ranges from 200°° C. to 450° C.

13. The method of claim 12, further comprising injecting ammonia or an ammonia precursor into the exhaust stream downstream from the LT-NA component and upstream from a selective catalytic reduction (SCR) catalyst article, wherein the timing and duration of said injecting is modulating according to the NOx release profile of the LT-NA component.

14. A method for modulating one or both of a NOx adsorption/desorption profile of
   a LT-NA composition and a NOx desorption temperature range of a LT-NA composition, the LT-NA composition comprising:
      a rare-earth metal component;
      a platinum group metal (PGM) component; and
      a dopant, wherein the dopant is an oxide of boron, silicon, tin, phosphorus, antimony, or bismuth;
      wherein the PGM component and the dopant are disposed on or impregnated in the rare-earth metal component;
      the method comprising selecting the dopant and selecting the loading of the rare-earth
   metal component, the PGM component, and the dopant.

15. The method of claim 14, wherein the NOx desorption temperature ranges from about 150° C. to 400° C.

16. The method of claim 14, wherein modulating the NO, adsorption/desorption profile comprises adjusting the ratio of NO to $NO_2$ desorbed at a given temperature over the $NO_x$ desorption temperature range of the LT-NA composition.

17. A low-temperature NOx adsorber (LT-NA) composition comprising:
   a rare-earth metal component;
   a platinum group metal (PGM) component; and
   a dopant, wherein the dopant is an oxide of boron, silicon, tin, phosphorus, antimony, or bismuth;
   wherein the PGM and the dopant are disposed on or impregnated in the rare-earth metal component; and
   wherein the LT-NA composition is effective for storing the $NO_x$ at temperatures below 200° C., and releasing the stored NOx, at a predetermined temperature.

18. A low-temperature $NO_x$ adsorber (LT-NA) article comprising:
   a substrate; and
   one or more washcoats comprising the LT-NA composition of claim 17 disposed on at least a portion of the substrate.

* * * * *